US011088981B2

(12) United States Patent
Young et al.

(10) Patent No.: US 11,088,981 B2
(45) Date of Patent: Aug. 10, 2021

(54) RECEIVING A DATA OBJECT AT A DEVICE

(71) Applicant: Amazon Technologies, Inc., Seattle, WA (US)

(72) Inventors: Richard David Young, Seattle, WA (US); Rameez Loladia, Seattle, WA (US); Shyam Krishnamoorthy, Redmond, WA (US); Nihal Chand Jain, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 543 days.

(21) Appl. No.: 15/716,373

(22) Filed: Sep. 26, 2017

(65) Prior Publication Data

US 2019/0097962 A1    Mar. 28, 2019

(51) Int. Cl.
*G06F 8/654* (2018.01)
*H04L 12/58* (2006.01)

(52) U.S. Cl.
CPC ............ *H04L 51/28* (2013.01); *H04L 51/066* (2013.01); *H04L 51/14* (2013.01); *H04L 51/24* (2013.01); *H04L 51/30* (2013.01); *H04L 51/06* (2013.01); *H04L 51/34* (2013.01)

(58) Field of Classification Search
None
See application file for complete search history.

(56) References Cited

U.S. PATENT DOCUMENTS

| 2012/0272252 | A1 | 10/2012 | Beardsmore et al. |
| 2013/0275837 | A1* | 10/2013 | Heath .................. H04L 1/0057 714/776 |
| 2016/0294614 | A1* | 10/2016 | Searle ..................... G06F 8/654 |

FOREIGN PATENT DOCUMENTS

| GB | 2350758 | 12/2000 | |
| GB | 2350758 A | * 12/2000 | ............. G06F 9/546 |
| WO | WO 2016/014516 | 1/2016 | |

* cited by examiner

*Primary Examiner* — Nasser M Goodarzi
*Assistant Examiner* — Terrika Peterson
(74) *Attorney, Agent, or Firm* — Davis Wright Tremaine LLP

(57) ABSTRACT

A technology is provided for delivering a data object to device. Data delivery instructions to distribute a data object to a device may be received at a delivery service and include a storage location of the data object, a messaging topic, and a size of data receivable by the device. The data object is then divided into blocks corresponding to the size of data receivable by the device. A messaging topic is identified to which the device is subscribed via a messaging service. The blocks are sent to the device using the messaging topic and a network protocol installed on the device.

20 Claims, 12 Drawing Sheets

700

```
┌─────────────────────────────────────────────────────────────┐
│ Receiving data delivery instructions to distribute a data   │
│ object to a device, the data delivery instructions include  │──710
│ a storage location of the data object, a schedule for       │
│ deployment of the data object, a messaging topic, and a     │
│ data block size receivable by the device.                   │
└─────────────────────────────────────────────────────────────┘
                              │
                              ▼
┌─────────────────────────────────────────────────────────────┐
│ Dividing the data object into blocks corresponding to the   │──720
│ data block size receivable by the device.                   │
└─────────────────────────────────────────────────────────────┘
                              │
                              ▼
┌─────────────────────────────────────────────────────────────┐
│ Identifying a messaging topic to which the device is        │──730
│ subscribed via a publication/subscription messaging service.│
└─────────────────────────────────────────────────────────────┘
                              │
                              ▼
┌─────────────────────────────────────────────────────────────┐
│ Sending the blocks to the device using the messaging topic  │
│ and a network protocol already in use by the device prior   │──740
│ to subscription to the messaging topic.                     │
└─────────────────────────────────────────────────────────────┘
                              │
                              ▼
┌─────────────────────────────────────────────────────────────┐
│ Receiving a missing block message from the device           │──750
│ indicating a missing block was not received by the device.  │
└─────────────────────────────────────────────────────────────┘
                              │
                              ▼
┌─────────────────────────────────────────────────────────────┐
│ Re-sending the missing block via a delivery service to the  │──760
│ device.                                                     │
└─────────────────────────────────────────────────────────────┘
```

Receiving data delivery instructions to distribute a data object to a device, the data delivery instructions include a storage location of the data object, a messaging topic, and a size of data receivable by the device. — 810

Dividing the data object into blocks corresponding to the size of data receivable by the device. — 820

Identifying a messaging topic to which the device is subscribed via a messaging service. — 830

Sending the blocks to the device using the messaging topic. — 840

RECEIVING A DATA OBJECT AT A DEVICE

BACKGROUND

Electronic devices and computing systems have become ever-present in many aspects of society. Devices may be found in the workplace, at home, or at school. Computing systems may include computing and data storage systems to process and store data. Some computing systems have begun offering centralized, virtual computing options known as service provider environments that may reduce overall costs, improve availability, improve scalability, and reduce time to deploy new applications.

Advancements in communication technologies have allowed for even relatively simple electronic devices to communicate with other devices and computing systems over a computer network. Computing networks or service provider environments may also communicate with resource constrained devices, such as microcontroller units (MCUs) or Internet of Things (IoT) devices. Resource constrained devices may communicate using a lightweight messaging protocol and may have limited resources for sending and receiving messages, notifications, or data.

BRIEF DESCRIPTION OF THE DRAWINGS

FIGS. 7 and 8 are flowcharts of example methods for delivering a data object to a device according to an example of the present technology.

DETAILED DESCRIPTION

Figure 1:
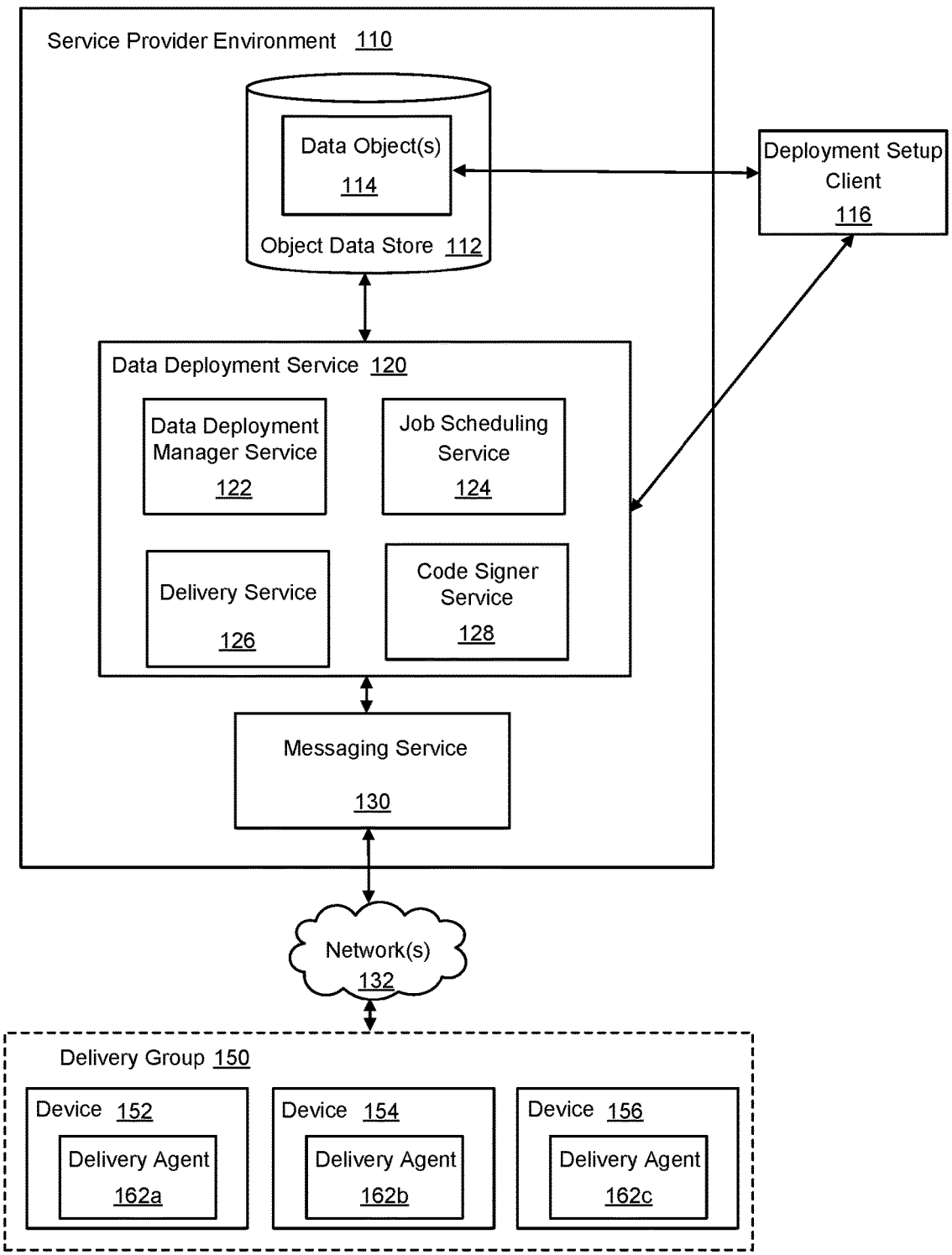
FIG. 1 is a block diagram illustrating systems for delivering a data object to a device according to an example of the present technology.

The present technology may use a data deployment service to send a data object to a device, which may be a resource constrained device. In one example, the delivery of the data object may use data blocks which are streamed to the device via a publication-subscription messaging topic of a messaging service. The device may be part of a deployment group of devices which is identified as a group for receiving copies of the data object. In one example, a device may be a device with limited capabilities such as a limited communication memory buffer size. In addition, the device may be a microcontroller unit (MCU) or an Internet of Things (IoT) device.

The data object to be delivered may be any type of data such as an application, application update data, firmware, firmware update data, operating system update data, configuration data, a message, and/or a command for the device to execute. The data object may be sent to the device using one or more services for setting up a channel and delivering (e.g., streaming) the data object to the device. For example, a data deployment manager service may be used to configure devices and a delivery service may deliver the data object. The data deployment manager service may be configured to receive delivery configuration data from a deployment setup client. More specifically, the data deployment manager service may receive delivery configuration data that indicates the data object name (or identifier), the storage location of the data object, and the identity of the device or group of devices to receive the data object. The data deployment manager service may also receive a time or schedule for delivering the data object to the device.

The data deployment manager service may send the delivery configuration data to a job scheduling service. The job scheduling service may use the delivery configuration data to implement a deployment or delivery schedule for the data object to be delivered to the device or group of devices. The job scheduling service may also notify the device or group of devices of the deployment schedule. In one aspect, the device may subscribe to a scheduling topic in a publication/subscription messaging service associated with the job scheduling service, and the job scheduling service may send notifications to the device (or group of devices) regarding the deployment of the data object. Thus, the scheduling notifications may be sent to the device using the publication/subscription messaging service. The notifications associated with the scheduling topic may also notify the device that the source of the data object is a messaging topic via which the data object may be sent to the device in blocks by a delivery service.

The delivery service may be a service that may be in communication with the job scheduling service. The delivery service may receive the location of the data object, and the delivery service may break up or divide the data object into chunks or blocks smaller than the size of the data object. The size of the blocks may be a size that is consumable by a device with limited or constrained resources. For example, if the device has a communication memory buffer that may receive 256 bytes of data, then the blocks may be sized to match the communication memory buffer of the device. The blocks may be prepared to be sent out via a messaging topic that is used by the delivery service to deliver the blocks to the device. In one example, the blocks may be streamed in messages that are sent out in a continuous stream from the delivery service to the messaging topic of the messaging service.

The device may subscribe to the messaging topic to receive the blocks for the data object via a publication/subscription messaging service (e.g., as notified to subscribe by the job scheduling service). For example, the blocks may use Message Queue Telemetry Transport (MQTT) or MQTT for Sensor Networks (MQTT-SN) as the transport layer and be sent through the publication/subscription messaging service. Once the device has received the blocks associated with the data object, the device may combine the blocks into the data object and the data object may be used, consumed, implemented or installed by the device. For example, a data object that is updated firmware for a device may be installed on the device for use. Alternatively, the blocks (e.g., data entries or configuration data) may be consumed by a device as the blocks are received from the delivery service.

A deployment group may include a group of devices that have been selected for receiving a data object and the devices in the group may have varying hardware and/or software capabilities. For example, a first device may be able to consume or receive data in blocks of a first size while a second device may be able to consume or receive data in blocks of a second size. The delivery service may divide the data object into blocks with the first size, and then the delivery service may then divide the data object into blocks of the second size. Accordingly, the data object may be copied and divided into more than one set of blocks with a different size for each set of blocks. The delivery service may then send blocks of the first size via a first messaging topic and blocks of the second size via a second messaging topic. Specific devices may subscribe to the messaging topic corresponding to the block size that the respective device is able to receive. Similarly, the delivery service may divide the data object into blocks with defined formats (e.g., JSON, binary or a proprietary format) and send out the set of blocks in the defined format to a messaging topic for that format.

The delivery service may send the blocks to the device using a communications protocol that is a lightweight transport protocol for use with resource constrained devices. The communications protocol may be a networking protocol that is employed by the device prior using the messaging capabilities of the present technology. For example, the device with constrained resources may not be capable of using or installing an additional networking protocol or an additional networking protocol may further constrain and place additional burdens on the device. By using a network protocol already in use by the device, the present technology may not place additional burdens on the device regarding an additional network protocol. In one aspect, the networking protocol may be MQTT or MQTT-SN.

The device may receive the blocks for the data object with a map that identifies the list of blocks associated with the data object. The device may employ the map to identify that one or more blocks associated with the data object are missing. The device may then notify the delivery service of the missing blocks. For example, the device may notify the delivery service regarding the missing blocks using a messaging topic, an API call or another messaging method. The delivery service may then re-send the missing blocks to the device.

The data object may employ a signature or means of authentication to ensure that an authorized data object is received and consumed by the device. For example, a device may be configured to accept an authorized data object and to reject data objects that are not authorized. The data object may be signed using a code signer service hosted in the service provider environment. The signature may be broken into one or more blocks by the delivery service and then may be delivered or pushed to the device. A block may be flagged as a signature block for the device to recognize which blocks are signature blocks. Once one signature block is received, the device may set aside any other signature blocks until the signature blocks that complete the full signature are received at the device. When the signature blocks are received, the device may then combine the signature blocks to obtain a signature and then use the signature to authenticate the data object. After authentication, the device may notify the delivery service or the job scheduling service that the deployment of the data object is complete at the device. The device may also be capable of notifying the delivery service of an error in the deployment. The delivery service or the job scheduling service may notify the data deployment manager service of the status of the deployment regarding the device, and the data deployment manager service may notify the deployment setup client regarding the deployment.

FIG. 1 illustrates an environment 100 for delivering a data object to a device according to an example of the present technology. The environment 100 may include a service provider environment 110 that includes an object data store 112, a data deployment service 120, and a messaging service 130.

The service provider environment 110 may be described as a plurality of computing systems or services employed to provide virtualized computing services accessible to devices, applications, or other services via a network 132 (e.g., the internet). In one aspect, the service provider environment 110 may be connected to devices 152, 154, 156 and a deployment setup client 116 via the network 132. As an example, the devices 152, 154, 156 may be resource constrained devices, such as MCUs or IoT devices. IoT devices may be any type of home automation devices, factory automation devices, farm automation devices, transportation devices, vehicles, medical devices, energy management devices, sensors, actuators, embedded electronic devices, or other devices. The deployment setup client 116 may be a computing device such as a desktop computer, workstation, mobile device, smart phone, set-top box, or tablet computer.

The service provider environment 110 may host the data deployment service 120 which may include a data deployment manager service 122, a job scheduling service 124, a delivery service 126, and/or a code signer service 128. Each of these services may be hosted on the same virtualized resources (e.g., on one computing instance or server) or may be hosted separately on different virtual resources (e.g., multiple computing instances) or non-virtual resources (e.g., hardware servers).

In one aspect, the deployment setup client 116 may be employed by a user to create, manage, and/or plan a deployment of a data object 114 to one or more of the devices 152, 154, 156. The devices 152, 154, 156 may be considered target devices which receive the data object 114. The deployment setup client 116 may send delivery configuration data to the data deployment manager service 122 because the data deployment manager service 122 may be used to setup and manage data deployments. The delivery configuration data may describe how a data deployment is to be configured, including specifying the data object 114 name, the location of the data object 114 in the object data store 112, and one or more devices to receive the data object 114. The data object 114 may be, but is not limited to, firmware, a firmware update, update data, an application, application update data, an operating system, operating system update data, configuration data (e.g. Wi-Fi and SSID data), certificate data, an executable image, credential rotation data, certificate rotation, or a command for the device to execute (e.g. reboot or a remote operation command).

The deployment setup client 116 may have a graphical or command line interface for accepting input from a user or customer. In addition, the deployment setup client 116 may send delivery configuration data to the data deployment manager service 122 using application programming interface (API) calls. The API calls may include commands such as create, read, update, delete, list, stop, get, etc., for managing a data deployment.

The data deployment manager service 122 may use the delivery configuration to identify that the deployment is to be to a delivery group 150 which encompasses more than one device. For example, FIG. 1 depicts a delivery group 150 as including a number of devices 152, 154, 156. The delivery group 150 may have any number of devices in the group. In an example case, where IoT devices are receiving data or an executable image deployed to devices, there may hundreds, thousands, or even millions of devices in a deployment group.

In one configuration, the data deployment manager service 122 may be employed to upload the data object 114 from the deployment setup client 116 to the object data store 112. Alternatively, the deployment setup client 116 may upload the data object 114 to the object data store 112.

The object data store 112 may be a data store service provided in a service provider environment 110 by a computing service provider to customers. A customer may access the object data store 112 from a customer environment or customer client, such as the deployment setup client 116. The object data store 112 may be accessed using an API to store and retrieve data. Further, the object data store 112 may be a service that is highly available and is managed by the service provider. Data may be stored in the object data store 112 as discrete units of storage called objects (such as the data object 114) which may be addressed and manipulated using keys (i.e., assigned unique identifiers). Objects may be placed in a data container (e.g., a bucket or storage pool), such that the objects exist at the same level in a flat address space. Configuration metadata may be assigned to the data containers and objects and configuration settings included in the configuration metadata may be configurable by a customer.

In alternative configurations, the data object 114 may be stored in other types of data stores. For example, the data object 114 may be stored: as an object in a memory of a server, a flat file in a non-volatile memory, a data value in a NoSQL data store, a data file in a virtualized block device, an object in a storage gateway, a blob or value in a relational data store, or any other type of data store from where the data object may be accessed using a computer network.

The data deployment manager service 122 may employ the delivery configuration data to generate data delivery instructions. The data delivery instructions may be sent to the job scheduling service 124. The data deployment manager service 122 may send all of the delivery configuration data or just a portion of the delivery data configuration used for scheduling. The job scheduling service 124 may schedule a deployment of the data object 114 to specified devices 152, 154, 154. The data delivery instructions may specify a data delivery schedule, a delivery group 150, and/or a data block size receivable by the devices, as dictated by the communication capabilities of the device. For example, the device may have a memory buffer that limits the amount of communication data that may be received by the client 152 at one time. The buffer may be measured in bytes (e.g. 256 bytes) or kilobytes (e.g., 1K). A reduced size buffer may make receiving a large data object 114 such as a firmware update or an application more difficult for the device 152 to perform in one download operation.

The job scheduling service 124 may send notifications to the device 152 notifying the device that data deployment is available. The notifications may be sent from the job scheduling service 124 using the messaging service 130, which may be a publication/subscription messaging service. For example, the device may be notified to subscribe to a topic associated with the job scheduling service 124. The topic associated with the job scheduling service 124 may be referred to as a scheduling topic. The notification to subscribe to a topic may be sent via the data deployment manager service 122, the job scheduling service 124, or the delivery service 126. The notification may also be for the device 152 to subscribe to a messaging topic to be used by the delivery service 126.

Once a device is subscribed to the scheduling topic, the device may receive notifications regarding the deployment of a data object 114. The device 154 may be provisioned with a certificate associated with the scheduling topic to ensure that the device has the right set of permissions for the scheduling topics. Other types of messaging may alternatively be used to communicate the availability of a data deployment to a device 154. For example, asynchronous queue messaging, SMS messaging, sockets or other types of messaging over a computer network may be used to communicate with a device 154. After a data object 114 is completely received by the device 152, the device may also notify the job scheduling service 124 of the status on the scheduling topic that is a status reporting topic.

Examples of a scheduling topic are:
$delivery/things/thing-name/jobs/notify
$delivery/things/myThing/jobs/get/accepted
$delivery/things/myThing/jobs/get/rejected The job scheduling service 124 can be considered a job orchestration and notification service which enables defining of a set of remote operations, which are sent to and executed on one or more devices 152, 154, 156. For example, the remote operations may instruct one or more devices to receive an application, firmware updates, reboot a device, rotate certificates, or perform remote troubleshooting operations. Furthermore, the job scheduling service 124 may be employed to schedule deployments, notify devices of the deployment and updates to the device specified by the deployment, generate status reports for the deployment, support long-lived deployments for update jobs, and/or support activities related to a deployment such as timeouts, retries, and roll-back of update jobs.

The job scheduling service 124 may also include other reliability mechanisms that are used to ensure a data object 114 is delivered. For example, the job scheduling service 124 may be configured to retry a failed delivery of a data object 114. In addition, phased delivery of the data objects may occur where sub-groups of the delivery group are sent (e.g., streamed) the blocks for the data object at separate times. Also, the job scheduling service 124 may track the amount of time taken to complete delivery of a data object 114. If the time to deliver a data object 114 exceeds a set or expected threshold, then the delivery may timeout and an administrator may be notified of the timeout. Support for long running or continuous jobs may also be provided by the job scheduling service 124.

The job scheduling service 124 may send data delivery instructions to the delivery service 126. For example, the delivery service 126 may subscribe to the scheduling topic. The delivery service 126 may subscribe to the same scheduling topic as the device or may subscribe to a scheduling topic created for the delivery service 126. Alternatively, the delivery service 126 may receive a notification or message directly from the job scheduling service 124.

The delivery service 126 may be configured to send the blocks for the data to the devices, such as resource constrained MCUs or IoT devices. The delivery service 126 may break or divide the data object 114 into blocks, which may be described as chunks of data. The blocks are created with a size that is receivable by the device. For example, if the device 152 has a communication buffer size of 1024 bytes, then the delivery service 126 may divide the data object 114 into blocks where each block has a maximum size of 1024 bytes. The delivery service 126 may then send or stream the blocks representing the data object 114 out to the device or group of devices in the deployment group. For example, the delivery service 126 may send the blocks with pauses or breaks in time between delivering one or more blocks or the delivery service 126 may continuously stream the blocks to the device. The delivery of the blocks may be initiated by a message received via the messaging service 130 or the delivery of the blocks may be initiated by the device 152 or delivery service 126.

The device may have subscribed to a messaging topic associated with the delivery service 126 to receive the blocks. The communication topic used by the delivery service 126 to send out the blocks may be referred to as a messaging topic. The blocks may be delivered to the device using a lightweight networking protocol (e.g., MQTT) as the transport layer. For example, the blocks may use MQTT or MQTT-SN in the transport layer and be sent through the publication/subscription messaging service using TCP/IP (transport control protocol/internet protocol), SMS (simple messaging service), or other message protocols. MQTT or MQTT-SN may be sent on top of or encapsulated in internet networking protocols (e.g. TCP/IP). However, other transport networking protocols may be used (e.g., UDP) for a device that has enough computing resources to support additional protocols. The blocks may be ordered and identified with a unique identifier for each block.

The delivery service 126 may have more than one messaging topic to which the delivery service 126 is publishing messages. For example, the delivery service 126 may divide the data object 114 into a first set of blocks with a first size. The delivery service 126 may then divide the same data object 114 into a second set of blocks with a second size. Each set of blocks with a set size for sending the data object 114 may have a unique messaging topic. An example of 3 different block delivery sizes on a messaging topic is shown:

$delivery/streams/MyStream/things/MyThing/256
$delivery/streams/MyStream/things/MyThing/512
$delivery/streams/MyStream/things/MyThing/2048

The device 154 may subscribe to the unique messaging topic to receive blocks with a block size that are receivable and consumable by the device 154. The blocks may be sent in messages to the device 154 because the device 154 is subscribed to the messaging topic via the messaging service 130, and the messaging service 130 may be a publication/subscription messaging service, as described earlier. The device may have a certificate associated with the messaging topic to ensure that the device has the right set of permissions for the messaging topic.

In one example, the job scheduling service 124 may notify the device 152 via the scheduling topic of the messaging topics that are available to subscribe to. In another example, the job scheduling service 124 may notify the device 152, via the scheduling topic, of a messaging topic that is available to subscribe to, and the device 152 via the agent 162 may append the block size compatible with device 152 to the messaging topic name (e.g., string). In yet another example, the device 152 may be hard configured or hard coded to subscribe to the messaging topic with a block size that is compatible with device 152. Furthermore, the messaging topic subscribed to by the device 152 may be unique to the device 152 and based on the client identification (ID) of the device 152.

In one aspect, the data object 114 may be received by and used, implemented, or installed upon the device 152. For example, the data object 114 may be an image used to replace or update firmware associated with the device 152. The device may receive the data object 114 in blocks, assemble the blocks, and then install the image.

In one aspect, the messaging topic may format the blocks with a format such as binary, JavaScript Object Notation (JSON) or another data format. The data object 114 may be divided into more than one set of blocks each with a different format and/or a different size of blocks and then each set of blocks may be associated with a unique messaging topic corresponding to the data format and block size desired by the respective device. An example of varying block delivery types and sizes is shown:

$delivery/streams/MyStream/things/MyThing/JSON/64
$delivery/streams/MyStream/things/MyThing/binary/64
$delivery/streams/MyStream/things/MyThing/JSON/256
$delivery/streams/MyStream/things/MyThing/binary/256

The device 154 may select the format type and/or block size desired to be received by subscribing to the corresponding messaging topic. In one aspect, each individual messaging topic is sent over a different communication channel and the device 154 specifies the type of format and/or block size by requesting a specific messaging topic. In a further example, a device may determine that the data format or block size the device is receiving is incorrect. By changing the device subscription to a different messaging topic, the device may then receive the correct data format or block size.

In one example, the delivery of blocks may be sent to a large number of devices at one time using a single messaging topic, the devices will be notified of when the delivery of blocks is scheduled to begin. If for example, 1,000 devices are subscribed to the message stream, then the devices may each receive a copy of blocks that are published or delivered using the messaging topic to which the devices have subscribed.

In one aspect, the data deployment manager service 122 may divide the data object 114 into blocks of a size usable by the device subscribed to a messaging topic of the messaging service 130. The delivery service 126 may then be relied upon to deliver the blocks to the device via the messaging service 130. The blocks may be delivered using a network protocol in use by the device.

In one configuration, a device 152, 154, 156 may communicate with the job scheduling service 124 or delivery service 126 using a delivery agent 162*a-c* loaded on the device 152, 154, 156. The delivery agent 162*a-c* may be lightweight process that runs on the device 152 or microcontroller unit (MCU), and the device may subscribe to data delivery or data deployment notifications from the job scheduling service 124 using the scheduling topics in order to be notified of a data object 114 to be delivered. Further, the delivery agent 162*a-c* may subscribe to the scheduling topics for obtaining queries from the job scheduling service 124 regarding the pending data delivery event. The delivery agent may also perform data transfer tasks onboard the device 152 and may report the status of the data delivery back to the job scheduling service 124.

In a further configuration, the delivery agent 162*a-c* may be configured to receive the blocks that make up the data object 114 and the delivery agent 162*a-c* may securely receive the data (e.g., an executable update, configuration information, etc.), handle interruptions during the reception of blocks via a messaging topic, and manage the data that is received in the blocks. The delivery agent 162*a-c* may manage the operations on the device 152 for securely receiving and combining the blocks received. The delivery agent 162a-c may receive the data object over a wireless connection (Wi-Fi, Zigbee, Bluetooth, etc.) in chunks or blocks from the delivery service 126, assemble the data object blocks together, verify the code signature, consume the data object (e.g., perform an update) and report the status back to the job scheduling service 124 via scheduling topics. The delivery agent 162a-c may receive the blocks using a network protocol such as MQTT or MQTT-SN. In addition, the delivery agent 162a-c may be configured for a specific operating system and hardware platform of the device 152.

A map may be generated by the delivery service 126 to identify the blocks associated with the data object 114, because the blocks may be delivered to the device out of order. Once the device has received a complete set of blocks for the data object 114, the device may combine or reconstruct the data object 114 and use, consume, implement, or install the data object 114 on the device. For example, a firmware update image may be loaded onto the device. Once the image has been installed, the device may reboot. Alternatively, the device may begin using a block as soon as the block is received. For example, portions of a configuration file may be received in a communication buffer and such configuration settings may be applied as the configuration settings are received.

The map associated with a set of blocks may be in a format such as a bitmap, JavaScript Object Notation (JSON) or another useful format. The map may also be employed by the device to ensure that the blocks in a set of blocks for the data object 114 are received. For example, the device 154 may use the map to identify that one or more blocks is missing from the set of blocks received by the device. The device 154 may then notify the delivery service 126 of any missing blocks and may identify any missing blocks using the identifier of the missing blocks that are described in the map. The delivery service 126 may then re-send the missing block or blocks to the device 154. The device 154 may also request that the entire set of blocks for the data object 114 be re-sent.

The network protocol employed by the delivery service 126 to send the blocks may be a network protocol that is already in use by the device. For example, the device 152 may be a resource constrained device. If the delivery service 126 were to employ a network protocol that is not already in use by the device 152, then the delivery service 126 would impose a new network protocol which would be loaded onto the client 152. Imposing a new network protocol onto the client 152 would further limit the already constrained resources of the device 152. In one aspect, the network protocol may be Message Queue Telemetry Transport (MQTT) or MQTT-SN and this protocol may be used as a transport layer for delivering the blocks. Each block may be delivered to the device as an MQTT message.

In one aspect, the data deployment service 120 may host or use the code signer service 128. The code signer service 128 may be optionally employed by the data deployment manager service 122 for authentication purposes to protect the integrity of the data object 114. The code signer service 128 may be used to generate a signature associated with the data object 114 to ensure authenticity and validity of the data object 114 and the source of the data object 114. In this process, a hash of the data object 114 may be computed and the hash may be signed with a private key of an asymmetric key pair. The code signer service 128 may manage the key pair, signing of the data object 114, and may be responsible for ensuring that the trusted root certificate is present on the device for verifying the signature. In one configuration, a device may be configured to only use or implement a data object that has been authenticated and is therefore software from a trusted source. This may prevent the device from being tampered with or instructed to carry out unauthorized commands. The code signer service 128 may be employed to sign an entire image of the data object 114 or a portion of the data object 114. To prevent tampering with a data object 114, the signing may use certificates that allow devices to validate that the data object 114 came from an authenticated source. The signature identifies the publisher or creator of the data object 114 and ensures the data object 114 is genuine. The code signer service 128 may also provide authorization controls, secure key storage, certificate management and audit trails. Alternatively, this signing process can also be manually managed by a user.

The signature generated for the data object 114 may also be divided into two or more blocks to be sent to the device. The device may identify the blocks associated with the signature before the data object 114 is implemented on the device. The blocks associated with the signature may be flagged by the code signer service 128 to indicate to the device which blocks in the set of blocks for the data object 114 are associated with the signature. When the device is receiving the blocks, the device identifies the blocks that are associated with the signature and may combine the blocks associated with the signature before the blocks for the data object 114 are combined. By combining the blocks for the signature, the device will be able to authenticate or validate the data object 114 using the signature.

In one further aspect, each block in the set of blocks for the data object 114 may be given a block type by the delivery service 126 or the code signer service 128. The block type may indicate which of the blocks are associated with the signature and which of the blocks are associated with the data for the data object 114. The block types may also be used by the data deployment manager service 122, deployment setup client 116, or delivery service 126 to mark any other type of data being sent in the blocks. For example, the blocks may be marked as executable data, data store information, signature data, configuration data, install image data, state data, message data, or any other data type that will assist the device in using or consuming the data.

In one aspect, the data object 114 may be entirely encrypted. Alternatively, each block in the set of blocks for the data object 114 may be encrypted prior to sending the blocks. In one configuration, an encryption service outside the data deployment service 120 may be used to encrypt the data object 114 or the individual blocks.

As an example, this technology may provide a managed service to enable secure data objects to be distributed to large groups of devices, such as: devices with reduced computing resources, groups of devices with resource constrained devices, groups of embedded devices, or groups of devices with microcontroller units (MCUs). In one specific example, a wireless update may be made to the firmware of a device and the wireless update may include the process of updating an executable image for the device. As resource constrained devices may be in use for a relatively long time, the ability to periodically push updates to the devices and continuously improve the device functionality is useful. This technology for sending data objects to a distributed fleet of devices may assist in fixing problems for the devices and continuously improving the devices.

In another example, if a device is to receive a data object that is an updated executable file, the source of the updated executable image may be authenticated by the device and the integrity of the new executable image may be validated by the device. The executable already executing on the device may not be permitted to alter its own executable code to prevent malware infections, and the risk of an interruption to the wireless update resulting in a partial update is high (for example, if the device loses power during an update). Managing such update complexity is more challenging for resource constrained devices because the limited processing power of the device means verification and validation algorithms take a relatively long time to execute, and the limited memory available in a device means that receiving an entire executable file at one time may not be possible. Therefore, the present technology may allow an executable image to be received in blocks, validated, and programmed into the device using multiple blocks.

Figure 2:
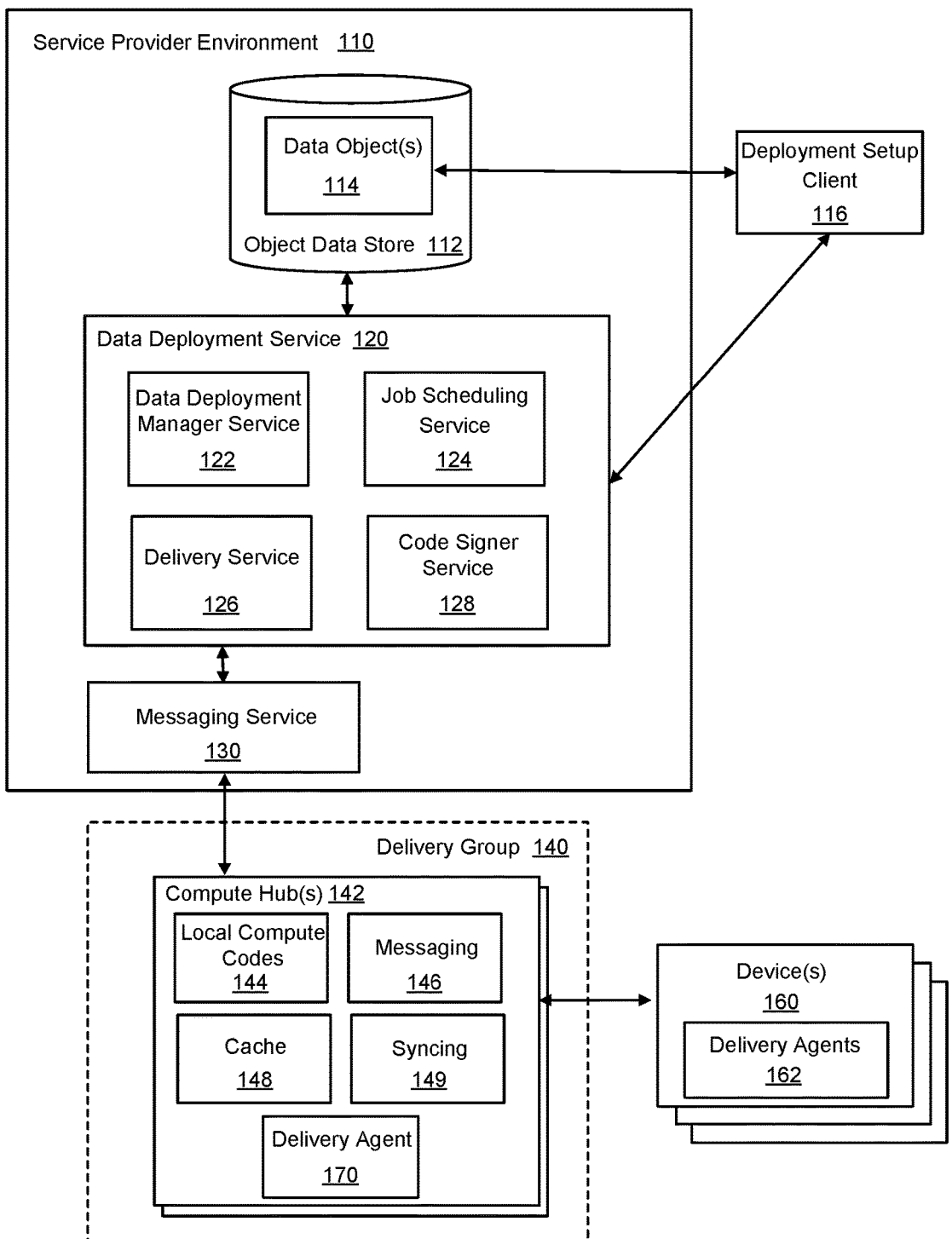
FIG. 2 is a block diagram illustrating systems for delivering a data object to a device that is a compute hub according to an example of the present technology.

FIG. 2 illustrates an environment 200 for delivering a data object 114 to a device 160 according to an example of the present technology. In one configuration, the delivery of the data object 114 may be in a streaming configuration. The computing environment 200 may include many of the same features and components of the environment 100 of FIG. 1. For example, the devices 160 and delivery agents 162 may be the same as the device 152, 154, and 156 and delivery agent 162a-c of FIG. 1.

The devices 160 may be devices 160 that are in communication with the compute hub(s) 142 in order to communicate with the service provider environment 110 and receive local compute functions offered by the compute hub(s) 142. The delivery agents 162 may be loaded on the devices 160 and may be a lightweight process that runs on the devices 160. In addition, the compute hub 142 may be configured to receive a delivery or deployment of a data object 114. The delivery group 140 may include computing devices (e.g., one or more compute hubs 142) that are designed to receive and use data, such as the blocks from the delivery service 126. The compute hub(s) 142 may be notified by the job scheduling service 124 or the delivery service 126 to subscribe to a messaging topic for receiving a data object. The delivery service 126 may send the blocks for a data object 114 to the compute hub(s) 142 using the same methods described above for delivering a data object to the device. While the compute hub(s) 142 are not necessarily as resource constrained, the compute hub(s) 142 may benefit from being able to receive data objects 114 in a quick, timely and managed way from the data deployment service 120.

The delivery group 140 may include a compute hub 142 that is a computing device with a processor and memory and wireless connectivity for communication with the devices 160. The compute hub 142 may include local compute codes 144 which include instructions for the compute hub 142 to execute. The local compute codes 144 may be similar to compute code functions that may be executed in a compute service in the service provider environment 110 but these functions are available to execute at a local device 160 without accessing the service provider environment 110. For example, computing instances may be provided in the compute hub 142, and the local compute codes 144 or compute code functions may execute using a compute service in the compute hub 142. The local compute codes 144 or compute code functions are portions of code that can be executed locally using the compute service at the request of the devices 160, and return results may also be provided to the devices. The local compute codes 144 may be functions that launch in a container on a computing instance executing on the compute hub 142 and are segments of program code that is capable of receiving parameters, performing processing, and returning values. In addition, the local compute codes 144 are terminated at the compute hub 142 once the local compute codes 144 return values. The data deployment service 120 may be used to update the local compute codes 144 that are stored in the compute hub 142. This may mean adding, removing or changing the local compute codes 144 that may execute on the compute hub 142. In addition, the local compute code service (not shown) for executing the local compute codes 144 may be updated using the data deployment service 120.

The compute hub 142 may include a cache 148 for storing reporting data or state data from the devices 160 while a service provider environment 110 is inaccessible. Once the service provider environment 110 becomes accessible again, the device data may be uploaded to the service provider environment 110. The compute hub 142 may also include messaging services 146 for providing messaging between the local devices 160. In addition, messaging intended for the service provider environment 110 may be queued up when access to the service provider environment 110 is not available. Then the messaging may be sent to the service provider environment 110 when the service provider environment 110 is available again.

The compute hub 142 may also include a syncing 149 service that is used to sync data and device states from the devices 160 to shadow device states in the service provider environment 110. More specifically, the compute hub 142 may cache the state of the devices 160, using a virtual version or "shadow" of each device, which tracks the device's current versus a desired state. These localized shadow states may be synchronized with shadow states in the service provider environment 110. In addition, the compute hub 142 may include a delivery agent 170 for communication with the data deployment service 120. The delivery agent 170 may operate in a similar fashion to the delivery agent in FIG. 1. The functionality of the compute hub 142 described earlier may be changed, modified or updated using the data deployment service 120 to deliver a data object 114 and then modify the functionality of the compute hub 142.

In an alternative configuration, the compute hub 142 may execute a local copy of the data deployment service or delivery service to allow the locally connected devices 160 to receive to receive a data object 114. Accordingly, the compute hub 142 may become a data delivery system, as has been described with respect to FIG. 1.

Figure 3A:
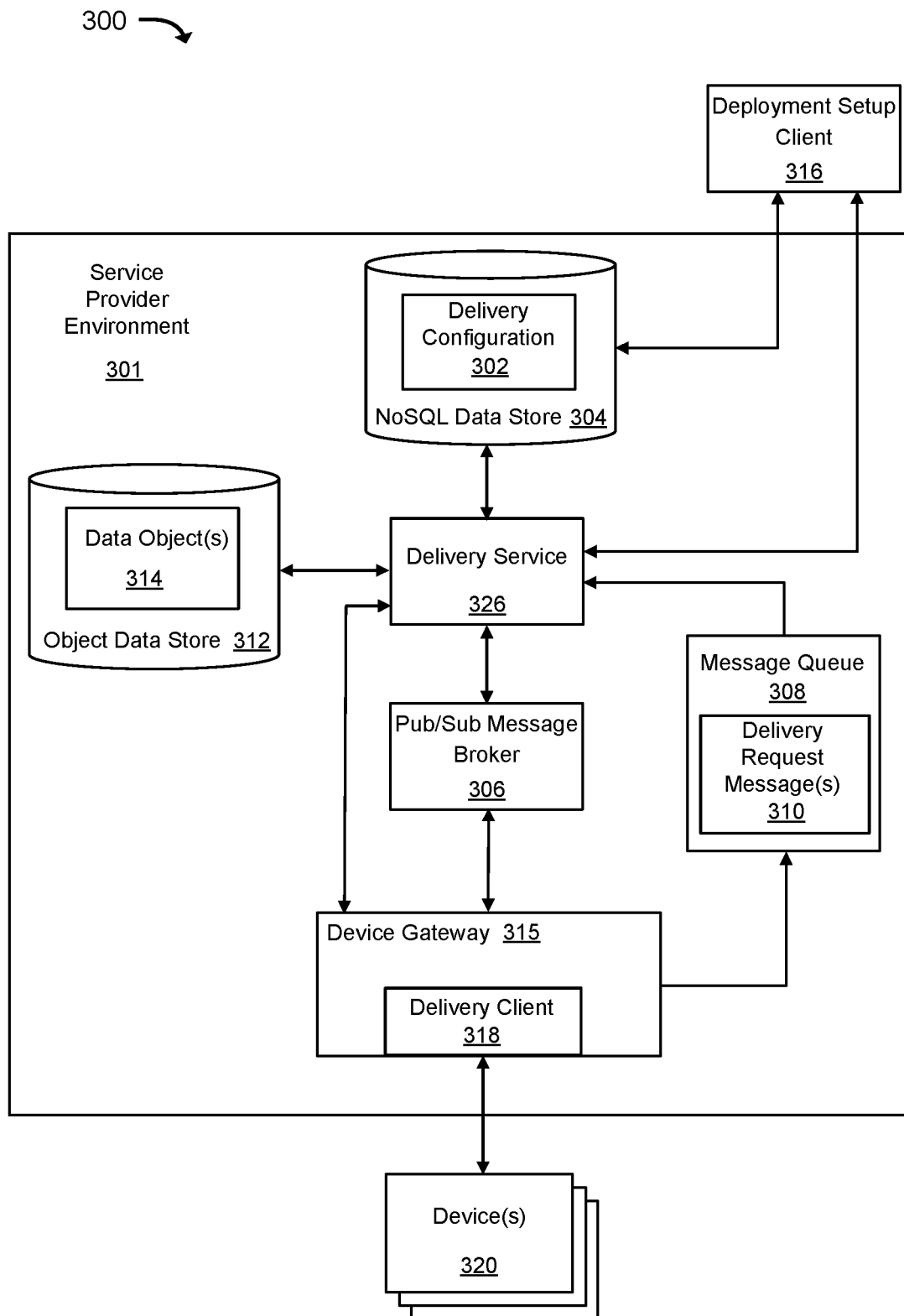
FIG. 3A is a block diagram illustrating systems for delivering a data object to a device using a delivery service according to an example of the present technology.

FIG. 3A illustrates an environment 300 for delivering a data object 314 to a device 320 according to an example of the present technology. The computing environment 300 may include many of the same features and components of the environment 100 of FIG. 1 and the environment 200 of FIG. 2. The environment 300 may include a service provider environment 301 that may have the same features and capabilities of the service provider environment 110 of FIG. 1. The environment 300 may include a deployment setup client 316 which may provide a delivery configuration 302 which includes delivery configuration data 302 from an administrator or customer to create and manage a deployment of a data object 314 located in an object data store 312. The delivery configuration 302 may be located in a NoSQL data store 304 (e.g., in a JSON document or as individual key-value pairs). The deployment of the data object 314 may be scheduled by the delivery service 326 and the device(s) 320 may be subscribed to an appropriate messaging topic when notified by the delivery service 326 to subscribe to the messaging topic.

The delivery service 326 may divide the data object 314 into blocks receivable by a device 320. As explained, the device 320 may have a subscription to a messaging topic to which the delivery service 326 may publish messages for delivering of the blocks created from the data object 314. In one example, the blocks may be streamed to the device 320. The device 320 may be subscribed to the messaging topic that has been created in the pub/sub message broker 306 by the delivery service 326. The pub/sub message broker 306 may be a message broker that is based on a publication/subscription model.

The message queue 308 may receive a delivery request message 310 from the device 320 and this message may be obtained by the delivery service 326. The receipt of the message by the delivery service 326 may initiate the delivery of the blocks or the delivery of blocks may be initiated by a user or customer. Alternatively, the delivery request message 310 may be a request for a missing block. The device 320 may communicate with the pub/sub message broker 306 and the message queue 308 via a device gateway 315 which may be considered an entry point for the device to access the device services (e.g., the delivery service 326 or other device services) in the service provider environment. The message queue 308 may also be used to report the status of delivery of a data object 314 to the device 320 (e.g., status of a delivery job).

The device gateway 315 may include a delivery client 318 to receive messages from the pub/sub message broker 306 and send the messages to the device 320. The device gateway 315 may be hosted in a service provider environment 301 and may act as a secure gateway for supporting communications (e.g., MQTT, Web Sockets, and HTTP (Hypertext Transfer Protocol) between the device 320 and the components hosted in the service provider environment such as the delivery service 326, the pub/sub message broker 306, and the message queue 308. Alternatively, the delivery service 326 may send data directly to the device gateway 315 and bypass the pub/sub message broker 306. For example, the endpoint for data blocks sent from the delivery service 326 may be a single device.

In one aspect, the deployment setup client 316 may trigger the delivery service 326 to start data deployment. For example, the trigger for initiating data deployment may be the deployment setup client 316 sending the configuration data to the service provider environment 301. The configuration data may be received by a data storage service in the service provider environment 301 which then triggers the delivery service 326 to start the process for data delivery.

Figure 3B:
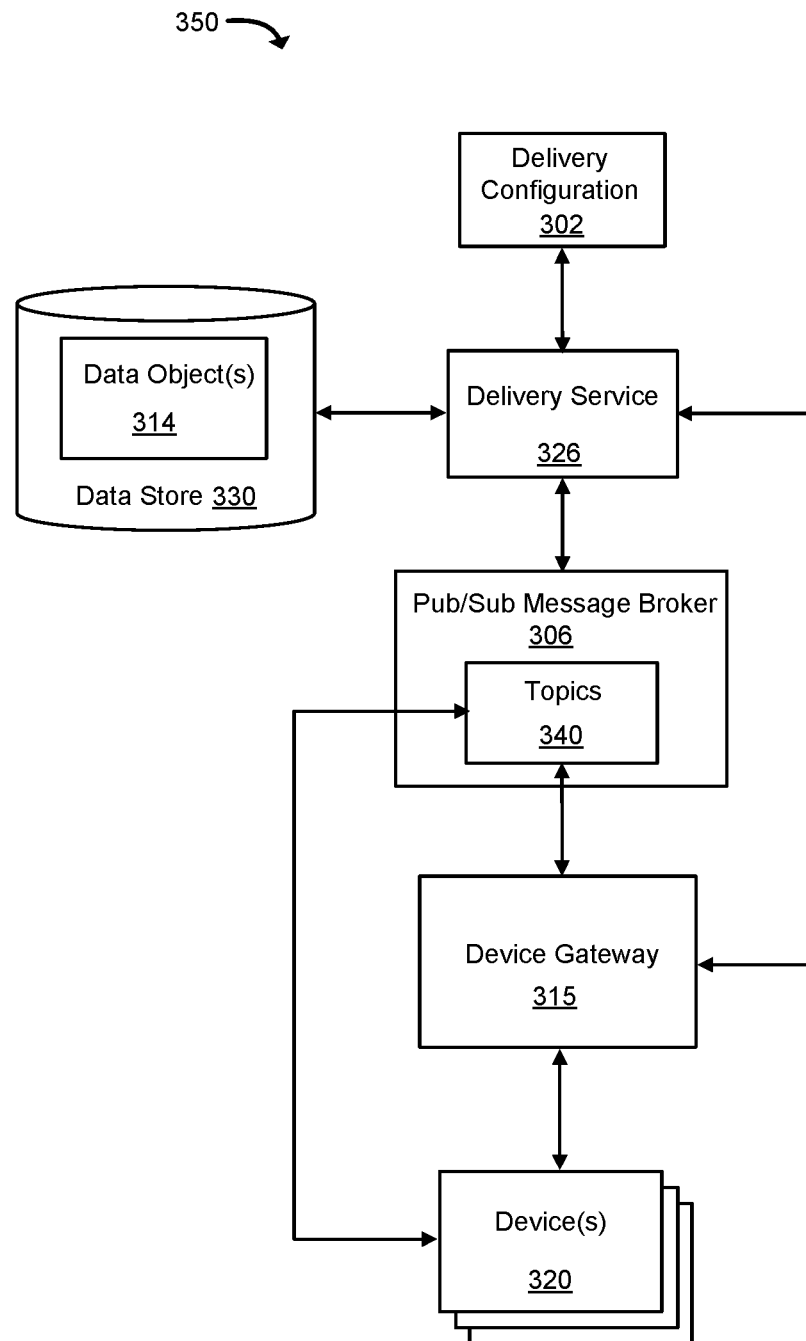
FIG. 3B is a block diagram illustrating a system for delivering a data object according to an example of the present technology.

FIG. 3B illustrates an environment 350 for delivering a data object 314 to a device 320 according to an example of the present technology. This example illustrates the delivery of the data object 314 without the use of a data deployment manager service, a job scheduling service, a code signer service, or a service provider environment. The computing elements and services shown in FIG. 3B may execute on servers or on physical hardware hosts. In this configuration, a delivery service 326 may receive a delivery configuration 302 that may be data to configure a deployment of a data object 314 to a device 320, and the delivery configuration 302 may be received from a source other than another service. For example, the delivery configuration 302 may be received by the delivery service 326 directly from a customer or user as created through a user interface on a client device. Alternatively, an event or notification received at the delivery service 326 may trigger the delivery service 326 to retrieve the delivery configuration 302 from a location such as: a configuration file sent by a user, a memory storage location, a server, a file or a data store where the data has been stored.

The delivery configuration 302 may identify a data store 330 as the location of where the data object 314 is stored. The data store 330 may be any type of data store that may store the data object, including: a file server, a storage gateway, a data storage disk array, a non-volatile memory array, or another type of data store.

The delivery service 326 may schedule a deployment of the data object 314 as defined by the delivery configuration 302 and notify the pub/sub message broker 306 of the desired message topics to be created. The delivery service 326 may also notify the device to subscribe to a topic 340 for receiving the blocks for the data object 314. The pub/sub message broker 306 may send notifications or messages to the devices 320 via the topics 340. In addition, the device gateway 315 may be employed as an entry point for the device 320 to access the device services of the pub/sub message broker 306 or the delivery service 326. In one aspect, the delivery service 326 may deliver data directly to the device 320 using the device gateway 315.

The delivery service 326 may divide a copy of the data object 314 into blocks that are receivable by the device 320. The delivery service 326 may then send the blocks to the device 340 via the pub/sub message broker 306 and device gateway 315. The blocks may be sent as messages pushed to the device 320 due to the subscription of the device 320 to the messaging topic 340.

Figure 4:
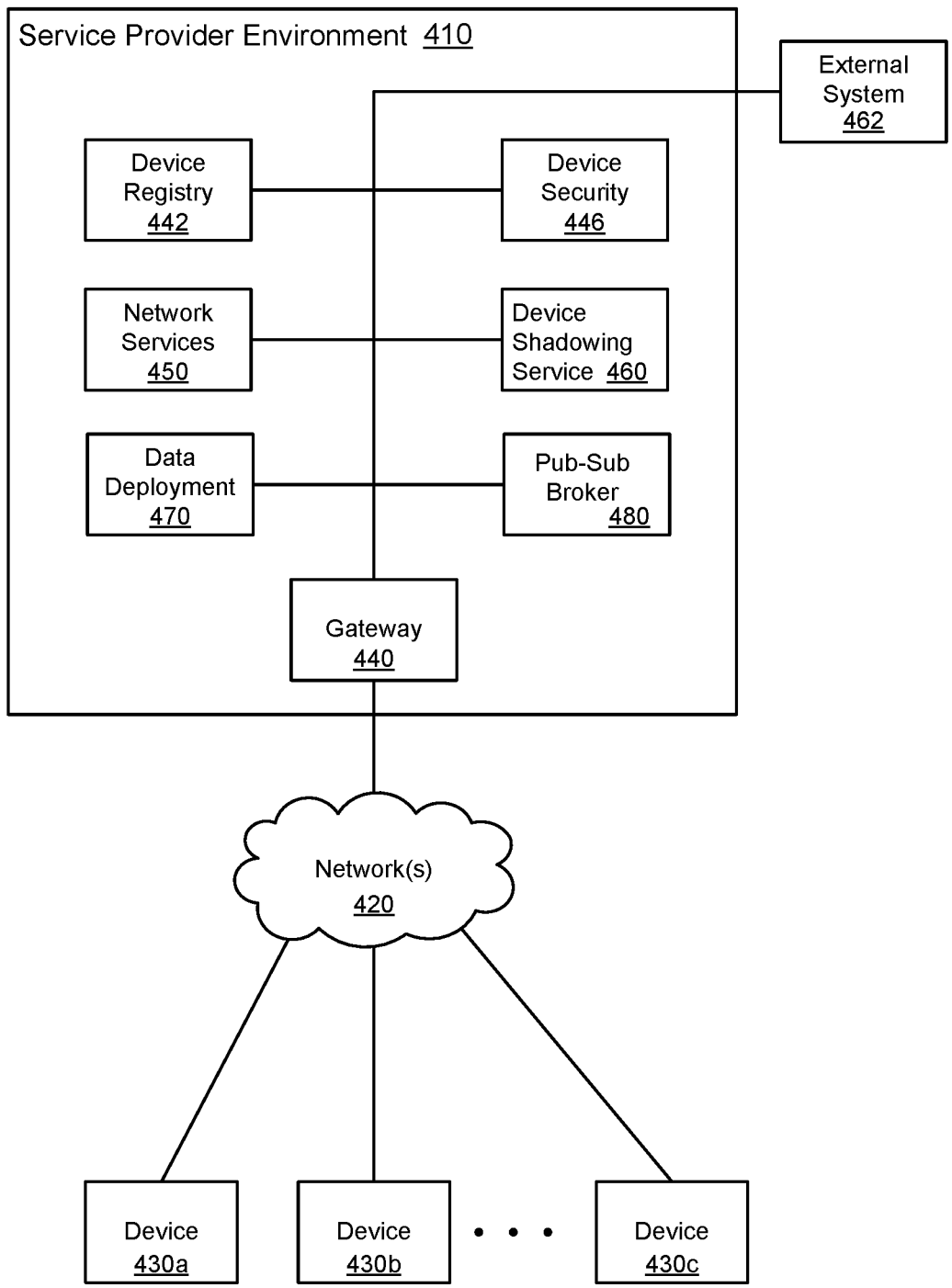
FIG. 4 illustrates a block diagram of an example architecture for providing devices access to network services in a service provider environment.

FIG. 4 is a block diagram illustrating an example service provider environment 410 with which the devices 430a-c (as described earlier) may communicate. Particularly, the environment of FIG. 4 may be useful for IoT devices, which were described earlier. IoT devices may be able to use the services illustrated in FIG. 4 and once connected use the data deployment service 470 of the technology described in FIGS. 1-3. The service provider environment 410 may include a device communication environment or device support system that comprises various resources made accessible to the devices 430a-c that access the gateway server 440 via a network 420. The devices 430a-c may communicate with the service provider environment 410 in order to access services such as a device shadowing service 460, data storage, and computing processing. Services operating in the service provider environment 410 may communicate data and messages to the devices 430a-c in response to requests from the devices 430a-c and/or in response to computing operations within the services.

The service provider environment 410 may comprise communicatively coupled component systems 440, 442, 446, 450, 460, 470 and 480 that operate to provide services to the devices 430a-c. The gateway server 440 may be configured to provide an interface between the devices 430a-c and the service provider environment 410. The gateway server 440 may receive requests from the devices 430a-c and may forward corresponding data and messages to the appropriate systems within the service provider environment 410. Likewise, when systems within the service provider environment 410 may attempt to communicate data instructions to the devices 430a-c, the gateway server 440 routes those requests to the correct device 430a.

The gateway server 440 may be adapted to communicate with varied devices 430a-c using various different computing and communication capabilities. For example, the gateway server 440 may be adapted to communicate using either TCP (Transmission Control Protocol) or UDP (User Datagram Protocol) protocols. Likewise, the gateway server 440 may be programmed to receive and communicate with the devices 430a-c using any suitable protocol including, for example, MQTT, CoAP, HTTP, and HTTPS. The gateway server 440 may be programmed to convert the data and instructions or messages received from the devices 430*a-c* into a format that may be used by other server systems in the service provider environment 410. In one example, the gateway server 440 may be adapted to convert a message received using the HTTPS protocol into a JSON formatted message that is suitable for communication to other servers within the service provider environment 410.

The gateway server 440 may store, or may control the storing, of information regarding the devices 430*a-c* that have formed a connection to the particular gateway server 440 and for which the particular gateway server 440 may be generally relied upon for communications with the device 430*a*. In one example, the gateway server 440 may have stored thereon information specifying the particular device 430*a* such as a device identifier. For each connection established from the particular device 430*a*, the gateway server 440 may also maintain information identifying the connection. For example, a connection identifier may be generated and stored for each connection established with a particular device 430*a*. Information relating to the particular connection may also be stored. For example, information identifying the particular socket of the gateway server 440 on which the connection was established, as well as information identifying the particular protocol used by the device 430*a* on the connection may be stored by the gateway server 440. Information such as the socket and protocol may be used in order to facilitate further communications via the particular connection.

In one example, the gateway server 440 may communicate via any suitable networking technology with a device registry server 442. The device registry server 442 may be adapted to track the attributes and capabilities of each device 430*a*. In an example, the device registry server 442 may be provisioned with information specifying the attributes of the devices 430*a-c*. The device registry server 442 may comprise data specifying rules or logic (e.g., automation rules) for handling various requests that may be received from the devices 430*a-c*. The device registry server 442 may be programmed to convert specialized device functions or commands received in particular communication protocols such as, for example HTTPS, MQTT, CoAP, into functions or commands using particular protocols that are understood by other of the servers in the service provider environment 410. In one example, the device registry server 442 may be provisioned with information specifying that upon receipt of a particular request from a particular device 430*a*, a request should be made to process and/or store the payload data of the request in a particular network service server 450. The device registry server 442 may be similarly programmed to receive requests from servers 442, 450 and convert those requests into commands and protocols understood by the devices 430*a-c*.

A customer may also be able to create a delivery group or group of devices in the device registry 442. These delivery groups may be retrieved by the delivery service from the device registry 442 as part of creating a deployment. In this case, a delivery group need not be defined with the data deployment but may be referred to using a delivery group defined in the device registry.

The device shadowing service server 460 may maintain state information for each connected device 430*a*. In an example embodiment, the device shadowing service server 460 maintains information specifying a plurality of states for each device 430*a* that has connected to the environment 410. In an example scenario, the device shadowing service server 460 may comprise a recorded state and a desired state. The recorded state represents the existing state of the particular devices 430*a-c* as presently known to the device shadowing service server 460. The device shadowing service server 460 may be configured to manage multi-step device state transitions. The device shadowing service server 460 communicates with the device gateway 440 in order to communicate requests to update a status to a particular device 430*a*. For example, the device shadowing server 460 may communicate a sequence of state transition commands to the device gateway 440 that update the status of a device 430*a*. The device gateway 440 may, in response, communicate the appropriate commands formatted for the particular device.

The device security server 446 maintains security-related information for the devices 430*a-c* that connect to the service provider environment 410. In one example, the device security server 446 may be programmed to process requests to register devices with the service provider environment 410. For example, entities such as device manufacturers, may forward requests to register devices 430*a-c* within the service provider environment 410. The device security server 446 receives registration requests and assigns unique device identifiers to devices 430*a-c* which use the device identifiers on subsequent requests to access the service provider environment 410. The device security server 446 stores, for each registered device, authentication information that may be provided during the device registration process. For example, a request to register a device 430*a* may comprise information identifying the device 430*a* such as a device serial number and information for use in authenticating the device 430*a*. In one example, the information may comprise a digital certificate and may comprise a public key of a public key-private key pair. The information may be stored in relation to the assigned device identifier for the particular device 430*a*. When the device 430*a* subsequently attempts to access the service provider environment 410, the request may be routed to the device security server 446 for evaluation. The device security server 446 determines whether authentication information provided in the request is consistent with the authentication information stored in relation to the device identifier and provided during the registration process.

The device security server 446 may be further programmed to process request to associate particular entities (individuals or organizations) with particular devices 430*a-c*. The device security server 446 may be adapted to receive requests to register entities, which may be, for example, individuals, users, accounts, and/or organizations, as authorized to control or communicate with a particular device 430*a*. In one example, a request may be received from an individual or organization that may have purchased a device 430*a* from a manufacturer. For example, the device may be a dishwasher, thermostat, or lighting assembly that an individual or organization purchased from the manufacturer. The individual or organization may initiate a request to register the device 430*a* with the individual or an organization with which the organization is associated. The request may be routed to a web services server which may be in service provider environment 410 or which communicates the request to the service provider environment 410. The request identifies the device 430*a* and the particular entity (individual or organization) that is requesting to be associated with the device 430*a*. In one example, the request may comprise a unique device identifier that was assigned when the device 430*a* was registered with the system. The request further may comprise information uniquely identifying the entity that is registering as having authority to communicate with and/or control the particular device 430*a*.

The device security server 446 stores the information identifying the particular entity in relation with the device identifier. When the particular entity subsequently attempts to control or communicate data to the particular device 430a, the device security server 446 may use the information to confirm that the particular entity is authorized to communicate with or control the particular device 430a. When an entity that has not been registered as being authorized to communicate with the device 430a attempts to communicate with or control the device 430a, the device security server 446 may use the information stored in the device security server 446 to deny the request.

A network services server 450 may be any resource or processing server that may be used by any of servers 440, 442, 446, 460, 470 or 480 in processing requests from the devices 430a-c. In one example, network services server 450 may provide data storage and retrieval services and/or on-demand processing capacity. In an example scenario, the network services server 450 may be any of numerous network accessible services including, for example, web or cloud-based services. In one example, the network services server 450 may be programmed to provide particular processing for particular devices 430a-c and/or groups of devices 430a-c. For example, a network services server 450 may be provisioned with software that coordinates the operation of a particular set of devices 430a-c that control a particular manufacturing operation.

Servers 440, 442, 446, 450, 460, 470 and 480 may be communicatively coupled via any suitable networking hardware and software. For example, the servers may communicate via a local area network or wide area network or a virtualized overlay network in the service provider environment 410.

An external system 462 may access service provider environment 410 for any number of purposes. In one example, an external system 462 may be a system adapted to forward requests to register devices 430a-c with the service provider environment 410. For example, an external system 462 may include a server operated by or for a device manufacturer that sends requests to service provider environment 410, and device security server 446 in particular, to register devices 440 for operation with service provider environment 410. Similarly, the external system 462 may be a system operated to provide a gateway for entities (individuals or organizations) to register an ownership or control relationship with a particular device 440.

The devices 430a-c may be any devices that may be communicatively coupled via a network 420 with the service provider environment 410. For example, the devices 430a-c may be computing devices such as smart phones and tablet computers, automobiles, appliances such as washers and driers, industrial sensors, switches, control systems, etc. In one example, each of devices 430a-c may communicate over the network 420 to store data reflecting the operations of the particular device 430a and/or to request processing provided by, for example, a network services server 450. While FIG. 4 depicts three devices 430a-c, it will be appreciated that any number of devices 430a-c may access the service provider environment 410 via the gateway server 440. Further it will be appreciated that the devices 430a-c may employ various different communication protocols. For example, some devices 430a-c may transport data using TCP, while others may communicate data using UDP. Some devices 430a-c may use MQTT, while others may use CoAP, and still others may use HTTPs. It will also be appreciated that each of the devices 430a-c may be programmed to send and receive particular functions or commands in requests that are not compatible with other devices or even the systems within service provider environment 410. The gateway server 440 may be programmed to receive and, if needed, attend to converting such requests for processing with the service provider environment 410.

The service provider environment 410 may include a data deployment service 470 and a pub-sub broker 480. For example, the data deployment service 470 may have similar capabilities and features of the data deployment service 120 of FIG. 1 and may be employed to create, schedule, manage, and deliver a data object to the device 430a. The pub-sub broker 480 may have similar capabilities and features to the messaging service 130 of FIG. 1. The pub-sub broker may receive messages from the data deployment service 470 and forward the messages to devices 430a-c subscribed to particular messaging topics.

Figure 5:
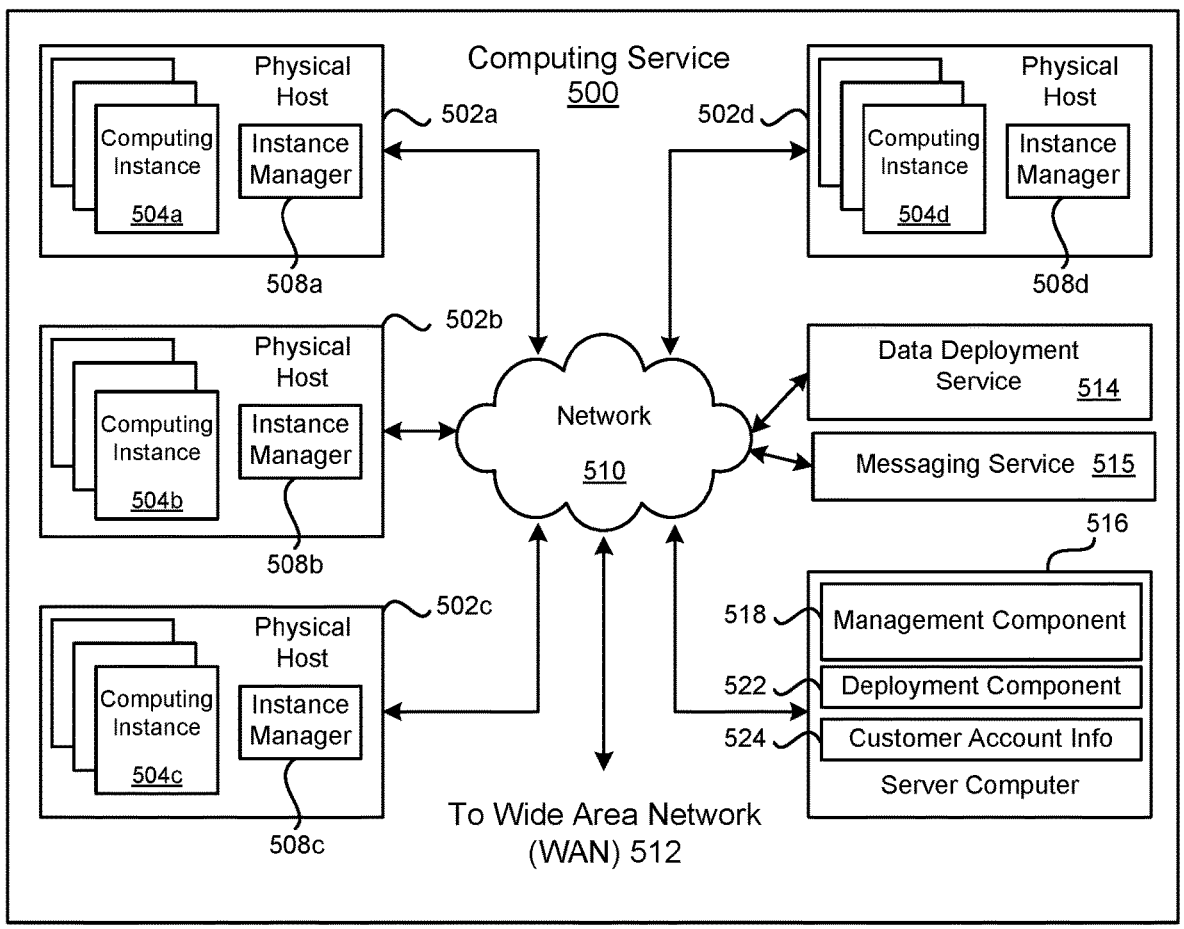
FIG. 5 is a block diagram that illustrates an example computing service environment according to an example of the present technology.

FIG. 5 is a block diagram illustrating an example computing service 500 that may be used to execute software services in a computing service environment or service provider environment. In particular, the computing service 500 depicted illustrates one environment in which the technology described in this description may be used. The computing service 500 may be one type of environment that includes various virtualized service resources that may be used, for instance, to host computing instances 504a-d on which a computing service may execute.

The computing service 500 may be capable of delivery of computing, storage and networking capacity as a software service to a community of end recipients. In one example, the computing service 500 may be established for an organization by or on behalf of the organization. That is, the computing service 500 may offer a "private cloud environment." In another example, the computing service 500 may support a multi-tenant environment, wherein a plurality of customers may operate independently (i.e., a public cloud environment). Generally speaking, the computing service 500 may provide the following models: Infrastructure as a Service ("IaaS"), Platform as a Service ("PaaS"), and/or Software as a Service ("SaaS"). Other models may be provided. For the IaaS model, the computing service 500 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 500. End customers may access the computing service 500 using networked client devices, such as desktop computers, laptops, tablets, smartphones, etc. running web browsers or other lightweight client applications, for example. Illustratively, the computing service 500 may be described as a "cloud" environment.

The particularly illustrated computing service 500 may include a plurality of server computers 502a-d. While four server computers are shown, any number may be used, and large data centers may include thousands of server computers. The computing service 500 may provide computing resources for executing computing instances 504a-d. Computing instances 504a-d may, for example, be virtual machines. A virtual machine may be an instance of a software implementation of a machine (i.e., a computer) that executes applications like a physical machine. In the example of a virtual machine, each of the server computers 502a-d may be configured to execute an instance manager 508a-d capable of executing the instances. The instance manager 508a-d may be a hypervisor, virtual machine monitor (VMM), or another type of program configured to enable the execution of multiple computing instances 504a-d on a single server. Additionally, each of the computing instances 504a-d may be configured to execute one or more applications.

In one aspect, the computing service 500 may include a data deployment service 514 and a messaging service 515 which may have the same features and capabilities of the data deployment service 120 and the messaging service 130 of FIG. 1. For example, data deployment service 514 may be employed to create, schedule, manage and deliver a data object to a device using the messaging service 515. One or more server computers 516 may be reserved to execute software components for managing the operation of the computing service 500 and the computing instances 504a-d. A server computer 516 may execute a management component 518. A customer may access the management component 518 to configure various aspects of the operation of the computing instances 504a-d purchased by a customer. For example, the customer may setup computing instances 504a-d and make changes to the configuration of the computing instances 504a-d.

A deployment component 522 may be used to assist customers in the deployment of computing instances 504a-d. The deployment component 522 may have access to account information associated with the computing instances 504a-d, such as the name of an owner of the account, credit card information, country of the owner, etc. The deployment component 522 may receive a configuration from a customer that includes data describing how computing instances 504a-d may be configured. For example, the configuration may include an operating system, provide one or more applications to be installed in computing instances 504a-d, provide scripts and/or other types of code to be executed for configuring computing instances 504a-d, provide cache logic specifying how an application cache may be prepared, and other types of information. The deployment component 522 may utilize the customer-provided configuration and cache logic to configure, initialize, and launch computing instances 504a-d. The configuration, cache logic, and other information may be specified by a customer accessing the management component 518 or by providing this information directly to the deployment component 522.

Customer account information 524 may include any desired information associated with a customer of the multi-tenant environment. For example, the customer account information may include an identifier for a customer, a customer address, billing information, licensing information, customization parameters for launching instances, scheduling information, etc. As described above, the customer account information 524 may also include security information used in encryption of asynchronous responses to API requests. By "asynchronous" it is meant that the API response may be made at any time after the initial request and with a different network connection.

A network 510 may be utilized to interconnect the computing service 500 and the server computers 502a-d, 516. The network 510 may be a local area network (LAN) and may be connected to a Wide Area Network (WAN) 512 or the Internet, so that end customers may access the computing service 500. The network topology illustrated in FIG. 5 has been simplified; many more networks and networking devices may be utilized to interconnect the various computing systems disclosed herein.

Figure 6:
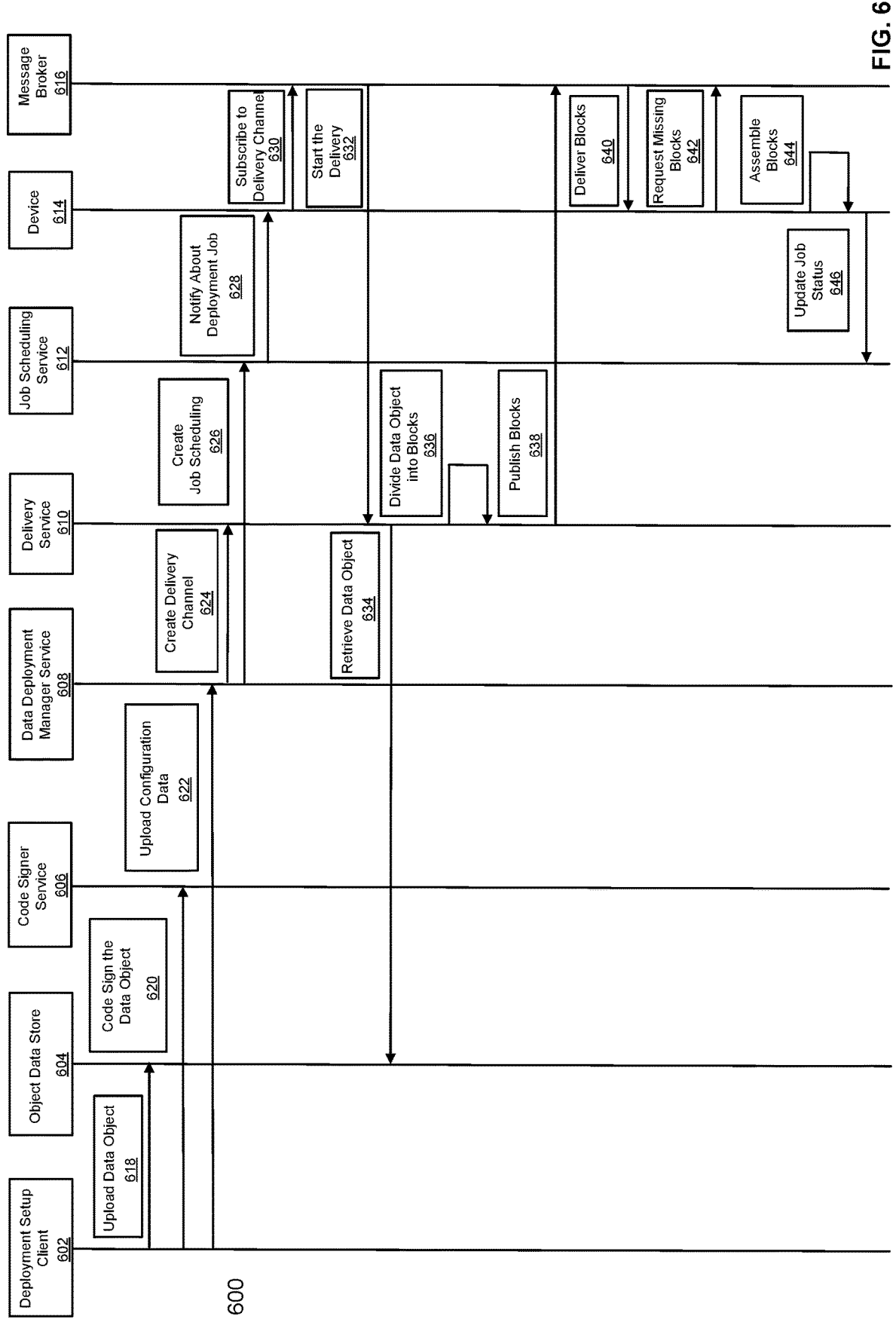
FIG. 6 is an example flowchart for delivering a data object to a device according to an example of the present technology.

FIG. 6 is an end-to-end flow diagram of an example method 600 for delivering a data object to a device according to an example of the present technology from a service provider environment point of view. The functionality of the method 600 may be implemented and executed as instructions on a machine, where the instructions are included on at least one computer readable medium or one non-transitory machine-readable storage medium. The method 600 may be carried out via a deployment setup client 602, an object data store 604, a code signer service 606, a data deployment manager service 608, a delivery service 610, a job scheduling service 612, a device 614, and a message broker 616 which may have features and capabilities, as described earlier in this description.

The discussion of this flow diagram in FIG. 6 assumes a number of prerequisite operations. One prerequisite operation is the device receiving the data object is provisioned with a certificate. In addition, the device may have the correct permissions to access messaging topics and scheduling topics. With the appropriate permissions, the device is assumed to have subscribed to a scheduling topic after receiving notification to subscribe.

The deployment setup client 602 may be used to upload a data object 618 to the object data store 604. The deployment setup client 602 may then optionally invoke the code signing of the data object 620 using the code signer service 606. For example, the code signer service 606 may be used to create a signature for the data object in order for the device to receive the data object to validate or authenticate the data object. The deployment setup client 602 may then upload configuration data 622 to the data deployment manager service 608. For example, the configuration data may be data from a user to create or manage a deployment of the data object to one or more devices such as the device 614. The configuration data may specify the deployment name, a delivery group of devices or target devices, an address or location for a data object, the signature and the certificate chain for the signature verification.

The data deployment manager service 608 may then create a delivery channel 624 on behalf of the data deployment or identify an already existing messaging topic to use for the delivery channel. The delivery channel may also be linked to the data object. The data deployment manager service 608 may then create job scheduling 626 on behalf of the data deployment. The job scheduling service 612 may manage the scheduling of the job and may notify the device 614 about a deployment job 628. The job scheduling service 612 may send notifications to the device 614 when the device 614 is subscribed to a scheduling topic associated with the job scheduling service 612. In addition, the device 614 may accept or reject the notification or the delivery of the data object.

The device 614 may then subscribe to a delivery channel 630 (e.g., a messaging topic) via the message broker 616. More specifically, the device 614 may have received the messaging topic name, the signature and certificate chain in order to subscribe. The device 614 may subscribe to the delivery channel by subscribing to the messaging topic via the message broker 616, and the messaging topic may be associated with the delivery service 610. The delivery channel may be a stream of data published via the messaging topic for the data object. The message broker 616 may then start the delivery 632 by contacting the delivery service 610.

The delivery service 610 may then retrieve the data object 634 from the object data store 604 and divide the data object into blocks 636. The data object may be divided into blocks that are receivable or consumable by the device 614 that may be resource constrained. The delivery service 610 may then publish blocks 638 to the message broker 616 where the blocks are associated with the data object. The message broker 616 may then send the blocks 640 to the device 614. After the device 614 receives the blocks, the device may assembles them into the object data, and then verify the authenticity of the signature and the integrity of the data object using the code signature and certificate chain received previously. The certificate chain must anchor to a root certificate in the device's trust store to authenticate the signature. To verify the integrity, the device 614 may re-computes the hash (or signed hash as previously described) of the obtained data object and compares the computed hash with a hash sent by the job scheduling service. If both the checks succeed, the device may use the data object.

In an additional scenario, the blocks may be delivered to the device 614 with a map that maps each of the blocks in the set of blocks for the data object. The device 614 may identify that one or more of the blocks are missing based on the map. The device 614 may request missing blocks 642 from the message broker 616. The delivery service 610 may then send the missing blocks via the message broker 616. The device 614 may then assemble blocks 644 to assemble the data object as a complete object. Furthermore, the device 614 may update the job status 646 regarding the status of the completed or uncompleted job for deploying the data object to the device 614.

FIG. 7 is a flowchart of an example method 700 for delivering a data object to a device according to an example of the present technology. The functionality 700 may be implemented as a method and executed as instructions on a machine, where the instructions are included on at least one computer readable medium or one non-transitory machine-readable storage medium. For example, starting in block 710, data delivery instructions to distribute a data object to a device may be received. The data delivery instructions may be received at a delivery service and include a storage location of the data object, a schedule for a deployment of the data object, a messaging topic, and a data block size receivable by the device. The data object may be divided into blocks corresponding to the data block size receivable by the device, as in block 720.

A messaging topic to which the device is subscribed may be identified via a publication/subscription messaging service, as in block 730. The messaging topic may be associated with a delivery service that has a plurality of messaging topics. Each of the messaging topics may be associated with a different block size and or data format of the block but multiple messaging topics may be used for the same data object. The device may indicate a block size and/or format by subscribing to a corresponding messaging topic. The data object may be associated with a signature and the signature may be sent as blocks in the set of blocks for the data object.

The blocks may be sent to the device using the messaging topic and a network protocol already in use by the device prior to subscription to the messaging topic, as in block 740. For example, the network protocol may be Message Queue Telemetry Transport (MQTT) or MQTT-SN. A missing block message at the delivery service from the device indicating a missing block was not received by the device, as in block 750. For example, the blocks may each be identified in a map. The map may be used by the device to identify and indicate which blocks are missing. The missing block may be re-sent via the delivery service to the device, as in block 760.

FIG. 8 is a flowchart of an example method 800 for delivering a data object to a device according to an example of the present technology. The functionality 800 may be implemented as a method and executed as instructions on a virtual machine or hardware machine, where the instructions are included on at least one computer readable medium or one non-transitory machine-readable storage medium. For example, starting in block 810, data delivery instructions to distribute a data object to a device may be received. The data delivery instructions may be received at a delivery service and comprise a storage location of the data object, a messaging topic, and a size of data receivable by the device. The data delivery instructions may be received from a job scheduling service. The job scheduling service may schedule the deployment of the data object. The data delivery instructions may be based on delivery configuration data received at a data deployment manager service from a deployment setup client, or the data delivery instructions may be setup using configuration files created by a customer or administrator. The device may be a microcontroller unit (MCU) or an internet of things (IoT) device.

The data object may be divided into blocks corresponding to the size of data receivable by the device, as in block 820. A code signer service may be used to place a signature in at least one of the blocks of the data object for determining authenticity of the data object. The blocks with signature data may be flagged to be recognized by the device. Each of the blocks may optionally be encrypted. For example, the encryption may be accomplished by an encrypting service that encrypts each of the blocks before the blocks are sent. In one alternative aspect, encryption may occur for the entire data object by the provider of the data object prior to the data being divided into blocks. Thus, encryption may occur before or after the data object is divided into blocks. In one additional example, Transport Layer Security (TLS) may be used to encrypt the blocks of the data object being sent using the TLS networking protocol.

A messaging topic may be identified to which the device is subscribed via a messaging service, as in block 830. The messaging topic may be associated with a delivery service that has a plurality of messaging topics. Each of the messaging topics may be associated with a different block size and or data format of block. There may also be multiple messaging topics for the same data object. The device may indicate a block size and/or format which the device may receive by subscribing to a corresponding topic. The data object may be associated with a signature and the signature may be sent with the data object as blocks in the set of blocks for the data object.

The blocks may be sent to the device using the messaging topic and a network protocol installed on the device, as in block 840. The network protocol may already be in use by the device prior to the delivering of the data object or subscribing to a topic for purposes of the present technology. The network protocol may be Message Queue Telemetry Transport (MQTT) or MQTT-SN.

A missing block message may be received from the device indicating a missing block was not received by the device. For example, the blocks may each be identified in a map. The map may be used by the device to identify and indicate which blocks are missing. The missing block may be re-delivered via the delivery service to the device.

The present technology may also be employed to send notifications regarding a status of the deployment of the data object back to a deployment setup client. For example, the device may send a completion message to the delivery service or the job scheduling service. The completion message may then be passed back to the data deployment manager service for the deployment setup client to access or receive.

Figure 9:
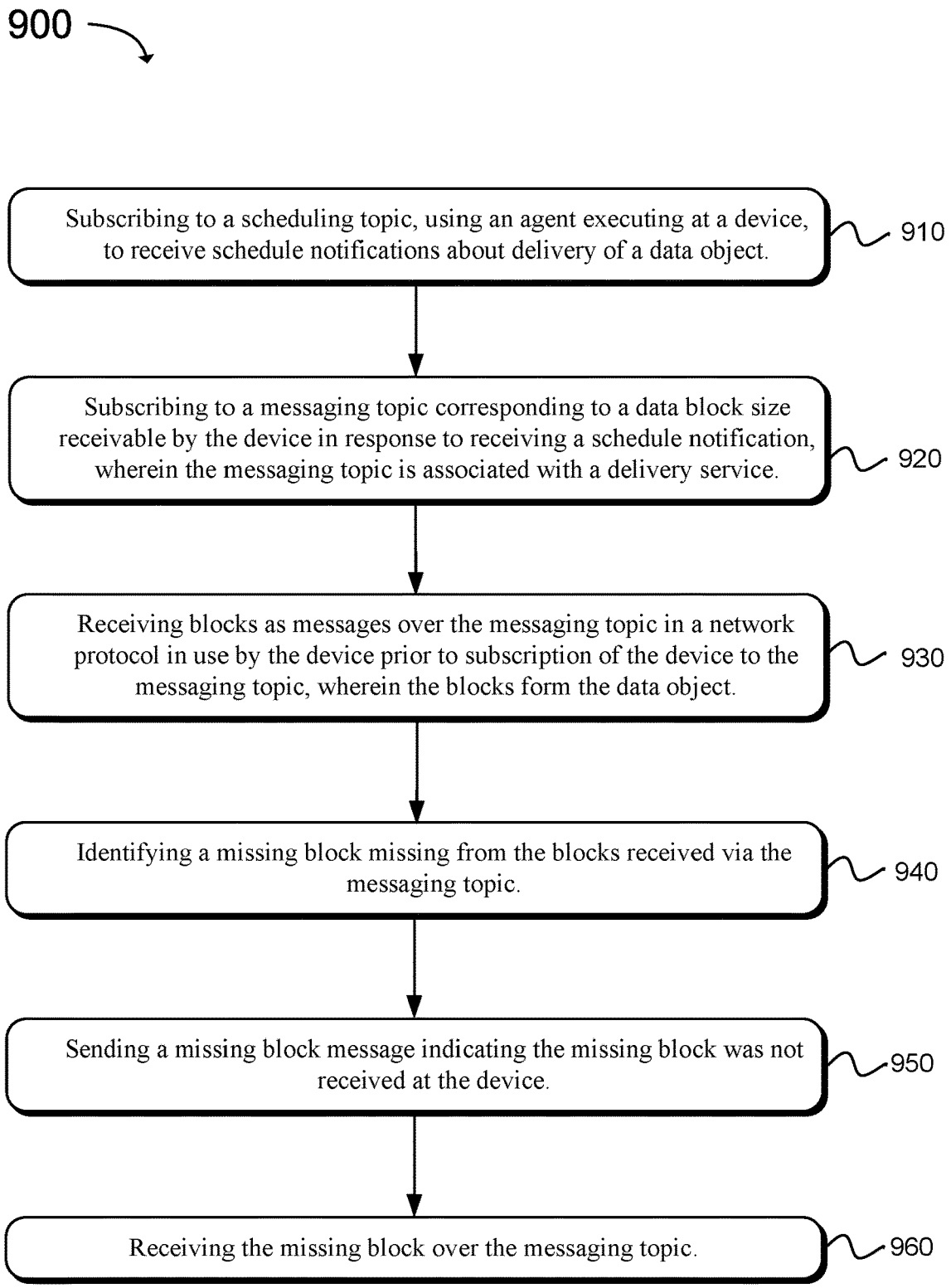
FIGS. 9 and 10 are flowcharts of example methods for receiving a data object at an agent executing on a device according to examples of the present technology.

FIG. 9 is a flowchart of an example method 900 for receiving a data object at an agent executing on a device according to an example of the present technology. The functionality may be implemented as a method and executed as instructions on a virtual machine or hardware machine, where the instructions are included on at least one computer readable medium or one non-transitory machine-readable storage medium. For example, starting in block 910, an agent executing at a device may be used to subscribe to a scheduling topic to receive schedule notifications about delivery of a data object. The device may be a microcontroller unit (MCU) or an internet of things (IoT) device.

A messaging topic corresponding to a data block size receivable by the device may be subscribed to in response to receiving a schedule notification, wherein the messaging topic is associated with a delivery service, as in block 920. This subscription may be performed by the agent on the device. The agent may select the messaging topic from a plurality of messaging topics associated with deployment of the data object. Each of the plurality of messaging topics may have a separate block size and the message topic may be selected by the agent based on the data block size that is receivable by the device.

Blocks may be received as messages over the messaging topic in a network protocol in use by the device prior to subscription of the device to the messaging topic, wherein the blocks form the data object, as in block 930. The network protocol may be Message Queue Telemetry Transport (MQTT) or MQTT for Sensor Networks (MQTT-SN).

An authenticity of the data object may be verified by the agent. One of the blocks may comprise a portion of a signature to authenticate the data object and the block with the portion of the signature may have a block type set by the delivery service representing signature data.

A missing block may be identified as missing from the blocks received via the messaging topic, as in block 940. For example, the agent may use a map to identify that one or more blocks is missing from the set of blocks received by the device. The device may then notify the delivery service of any missing blocks and may identify any missing blocks using the identifier of the missing blocks that are described in the map. As a result, a missing block message indicating the missing block was not received at the device may be sent from the agent, as in block 950. For example, the device may notify the delivery service regarding the missing blocks using a messaging topic, an API call or another messaging method. The missing block may be received by the agent over the messaging topic, as in block 960.

Figure 10:
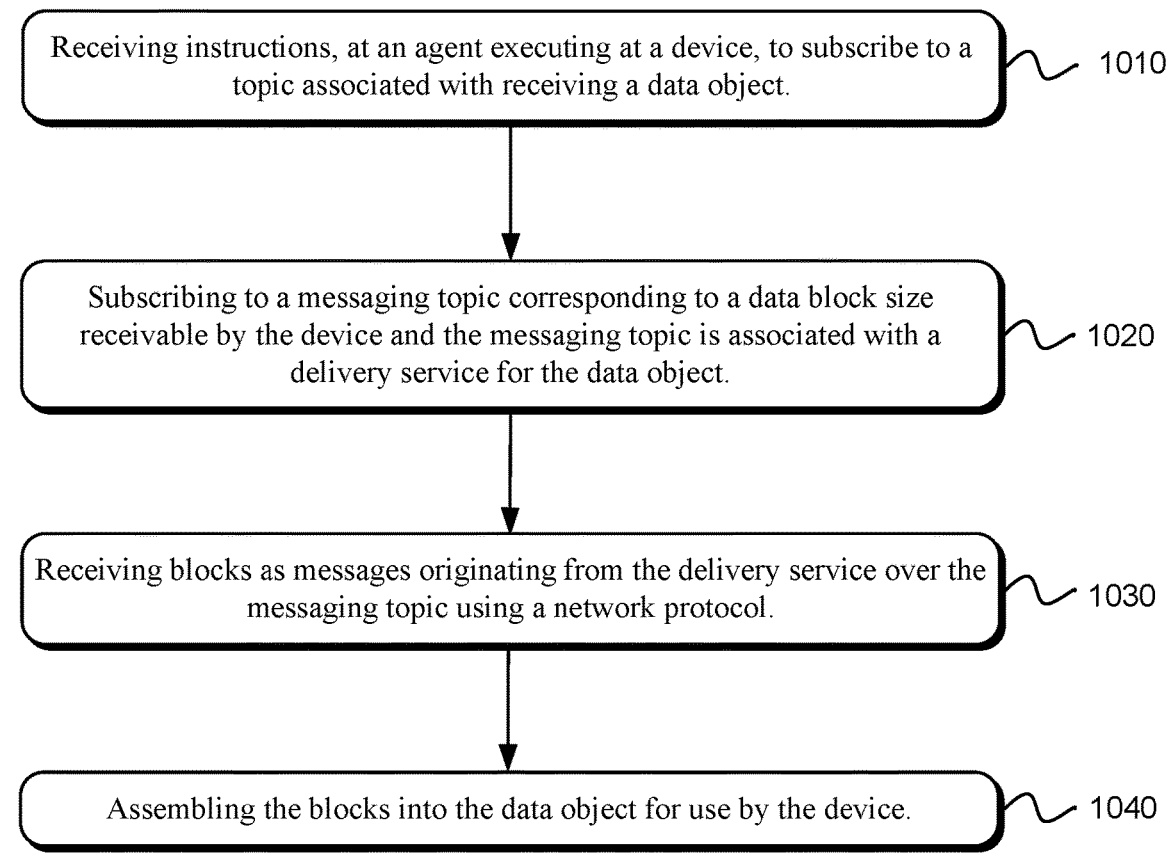

FIG. 10 is a flowchart of an example method 1000 for receiving a data object at an agent executing on a device according to an example of the present technology. The functionality may be implemented as a method and executed as instructions on a virtual machine or hardware machine, where the instructions are included on at least one computer readable medium or one non-transitory machine-readable storage medium. For example, starting in block 1010, instructions to subscribe to a topic may be received at an agent executing at a device and the topic may be associated with receiving a data object. The device may be a microcontroller unit (MCU) or an internet of things (IoT) device. The device may be a compute hub configured to execute code functions in response to a message received from a local device.

In one aspect, the agent may subscribe to a scheduling topic associated with a job scheduling service. The agent may receive schedule notifications about delivery of a data object. The schedule notifications may be the instructions to subscribe to the topic associated with receiving the data object.

A messaging topic may be subscribed to where the messaging topic may correspond to a data block size receivable by the device and the messaging topic is associated with a delivery service for the data object, as in block 1020. The agent may select the messaging topic from a plurality of messaging topics associated with deployment of the data object. Each of the plurality of messaging topics may have a separate block size and the message topic is selected based on the data block size that is receivable by the device.

Blocks may be received as messages originating from the delivery service over the messaging topic using a network protocol, as in block 1030. In one aspect, the network protocol for communication may be in use by the device prior to subscribing to the messaging topic. The network protocol may be Message Queue Telemetry Transport (MQTT) or MQTT for Sensor Networks (MQTT-SN). The blocks may also be received as a continuous stream.

In one aspect, a missing block may be identified by the agent as missing from the blocks received via the messaging topic. A missing block message may be sent indicating the missing block was not received by the device. The missing block may be received over the messaging topic.

The authenticity of the data object may be verified by the agent. One of the blocks may comprise a portion of a signature to authenticate the data object and the block with the portion of the signature may have a block type set by the delivery service representing signature data. A block that comprises a portion of the signature may be flagged as signature block such that the agent may set that block aside for assembly into the signature.

The blocks may be assembled into the data object for use by the device, as in block 1040. In one aspect, where the device is a compute hub, the data object received by the compute hub may be an update to at least one code function or another virtualized computing function or service hosted by the compute hub.

The image from the data block may be used or implemented at the device via the agent. For example, the agent may use the image for installing software, consuming data, updating an operating system, updating firmware, loading configuration data, and/or executing a function. The data object may be an application, application update data, firmware, firmware update data, operating system update data, configuration data, a message, or a command for the device to execute. A notification may also be sent from the agent to a data delivery management service regarding a status of the deployment of the data object at the device.

Figure 11:
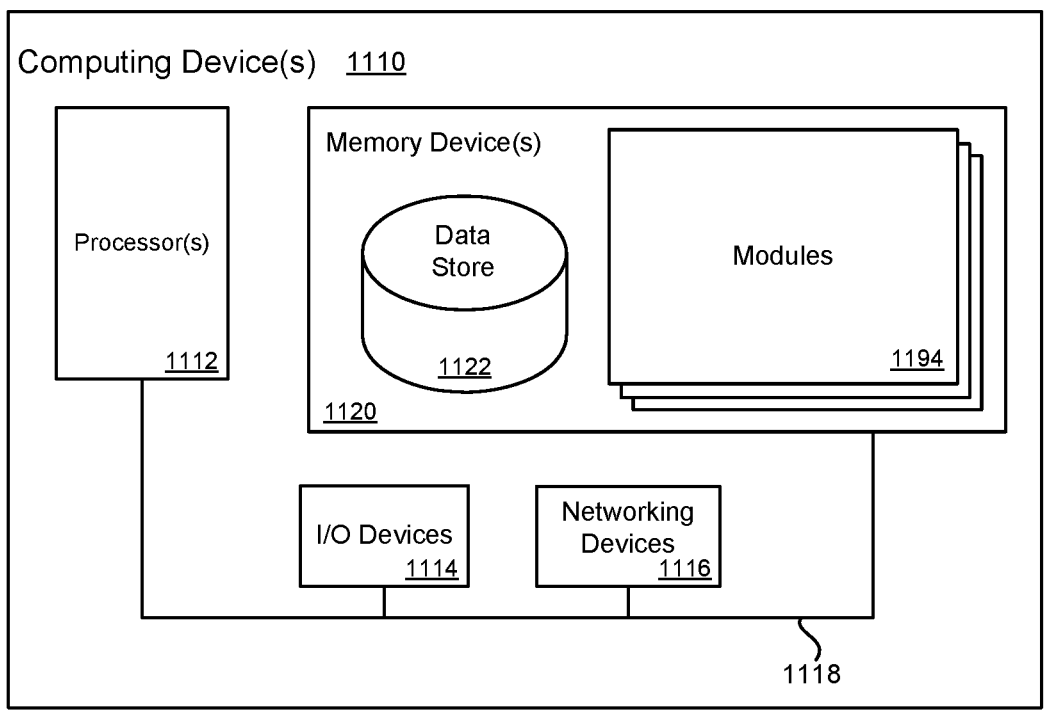
FIG. 11 is a block diagram that provides an example illustration of a computing device that may be employed in the present technology.

FIG. 11 illustrates a computing device 1110 on which modules of this technology may execute. A computing device 1110 is illustrated on which a high level example of the technology may be executed. The computing device 1110 may include one or more processors 1112 that are in communication with memory devices 1120. The computing device may include a local communication interface 1118 for the components in the computing device. For example, the local communication interface may be a local data bus and/or any related address or control busses as may be desired.

The memory device(s) 1120 may contain modules 1194 that are executable by the processor(s) 1112 and data for the modules 1194. The modules 1194 may execute the functions described earlier. A data store 1122 may also be located in the memory device 1120 for storing data related to the modules 1194 and other applications along with an operating system that is executable by the processor(s) 1112.

Other applications may also be stored in the memory device 1120 and may be executable by the processor(s) 1112. Components or modules discussed in this description that may be implemented in the form of software using high programming level languages that are compiled, interpreted or executed using a hybrid of the methods.

The computing device may also have access to I/O (input/output) devices 1114 that are usable by the computing devices. An example of an I/O device is a display screen that is available to display output from the computing devices. Other known I/O device may be used with the computing device as desired. Networking devices 1116 and similar communication devices may be included in the computing device. The networking devices 1116 may be wired or wireless networking devices that connect to the Internet, a LAN, WAN, or other computing network.

The components or modules that are shown as being stored in the memory device 1120 may be executed by the processor 1112. The term "executable" may mean a program file that is in a form that may be executed by a processor 1112. For example, a program in a higher level language may be compiled into machine code in a format that may be loaded into a random access portion of the memory device 1120 and executed by the processor 1112, or source code may be loaded by another executable program and interpreted to generate instructions in a random access portion of the memory to be executed by a processor. The executable program may be stored in any portion or component of the memory device 1120. For example, the memory device 1120 may be random access memory (RAM), read only memory (ROM), flash memory, a solid-state drive, memory card, a hard drive, optical disk, floppy disk, magnetic tape, or any other memory components.

The processor 1112 may represent multiple processors and the memory 1120 may represent multiple memory units that operate in parallel to the processing circuits. This may provide parallel processing channels for the processes and data in the system. The local interface 1118 may be used as a network to facilitate communication between any of the multiple processors and multiple memories. The local interface 1118 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A non-transitory machine readable storage medium comprising executable instructions that, as a result of execution by one or more processors of a computer system, cause the computer system to at least:
   subscribe to a scheduling topic, using an agent executing at a device, to receive schedule notifications about delivery of a data object;
   subscribe to a messaging topic corresponding to a data block size receivable by the device in response to receiving a schedule notification, wherein the messaging topic is associated with a delivery service, the agent selecting the messaging topic from a plurality of messaging topics associated with deployment of the data object, wherein each of the plurality of messaging topics has a separate block size and the message topic is selected based on the data block size that is receivable by the device;
   receive blocks as messages over the messaging topic in a network protocol in use by the device prior to subscription of the device to the messaging topic, wherein the blocks form the data object;
   identify a missing block missing from the blocks received via the messaging topic;
   send a missing block message indicating the missing block was not received at the device; and
   receive the missing block over the messaging topic.

2. The non-transitory machine readable storage medium of claim 1, wherein the network protocol is Message Queue Telemetry Transport (MQTT) or MQTT for Sensor Networks (MQTT-SN).

3. The non-transitory machine readable storage medium of claim 1, the instructions further comprise:
   verifying an authenticity of the data object based on at least one of the blocks that comprises a portion of a signature to authenticate the data object, and the block with the portion of the signature has a block type set by the delivery service representing signature data.

4. The non-transitory machine readable storage medium of claim 1, wherein a block is flagged as a signature block.

5. A computer-implemented method, comprising:
   receiving instructions, at an agent executing at a device, to subscribe to a topic associated with receiving a data object;
   subscribing to a messaging topic corresponding to a data block size receivable by the device, and the messaging topic is associated with a delivery service for the data object;
   receiving blocks as messages originating from the delivery service over the messaging topic using a network protocol;
   assembling the blocks into the data object for use by the device; and
   verifying authenticity of the data object based at least on one of the blocks that comprises a portion of a signature to authenticate the data object, wherein the block comprising the portion of the signature has a block type set by the delivery service representing signature data.

6. The method of claim 5, wherein the agent selects the messaging topic from a plurality of messaging topics associated with deployment of the data object, wherein each of the plurality of messaging topics has a separate block size and the message topic is selected based on the data block size that is receivable by the device.

7. The method of claim 5, further comprising:
   identifying a missing block from the blocks received via the messaging topic;
   sending a missing block message indicating the missing block was not received by the device; and
   receiving the missing block over the messaging topic.

8. The method of claim 5, wherein the device is a compute hub configured to execute code functions in response to a message received from a local device.

9. The method of claim 8, wherein the data object received by the compute hub is an update to at least one code function.

10. The method of claim 5, further comprising:
    subscribing to a scheduling topic associated with a job scheduling service to receive schedule notifications about delivery of the data object.

11. The method of claim 5, wherein the network protocol is Message Queue Telemetry Transport (MQTT) or MQTT for Sensor Networks (MQTT-SN).

12. The method of claim 5, wherein the at least one of the blocks that comprises the portion of the signature is flagged to enable the agent to recognize that the at least one of the blocks is a signature block.

13. The method of claim 5, further comprising:
    using an image from the data object at the device via the agent wherein the use is an action of at least one of: installing software, consuming data, updating an operating system, updating firmware, loading configuration data, or executing a function.

14. The method of claim 5, further comprising:
    sending a notification to a data delivery management service regarding a status of deployment of the data object at the device.

15. The method of claim 5, wherein the blocks are received over a stream using the network protocol.

16. The method of claim 5, wherein the data object is at least one of: an application, application update data, firmware, firmware update data, operating system update data, configuration data, a message, or a command for the device to execute.

17. The method of claim 5, wherein the delivery service generates a map to identify blocks associated with the data object.

18. A device comprising:
    at least one processor;
    and memory comprising computer-executable instructions that, upon execution, cause the at least one processor to:
receive instructions, at an agent executing on the device, to subscribe to a topic associated with a data object, wherein the agent selects the messaging topic from a plurality of messaging topics associated with deployment of the data object, wherein each of the plurality of messaging topics has a separate block size and the message topic is selected based on the data block size that is receivable by the device;
subscribe to a messaging topic associated with a delivery service in response to receiving a notification; and
receive blocks corresponding to a data block size receivable by the device and the blocks are received as messages over the messaging topic in a network protocol in use by the device prior to subscription of the device to the messaging topic, wherein the blocks form the data object; and assemble the blocks into the data object that is an image for use by the device.

19. The device of claim 18, the executable instructions further comprising:
identify a missing block missing from the blocks received via the messaging topic;
send a missing block message indicating the missing block was not received by the agent; and
receive the missing block over the messaging topic.

20. The system of claim 18, wherein the system requests missing blocks from the delivery service.

* * * * *